US 7,253,832 B2

(12) United States Patent
Iwaki et al.

(10) Patent No.: US 7,253,832 B2
(45) Date of Patent: Aug. 7, 2007

(54) SHAPE EXTRACTION SYSTEM AND 3-D (THREE DIMENSION) INFORMATION ACQUISITION SYSTEM USING THE SAME

(75) Inventors: Hidekazu Iwaki, Hachioji (JP); Takashi Miyoshi, Hachioji (JP); Kazuhiko Arai, Hachioji (JP)

(73) Assignee: Olympus Corporation, Tokyo (JP)

( * ) Notice: Subject to any disclaimer, the term of this patent is extended or adjusted under 35 U.S.C. 154(b) by 1055 days.

(21) Appl. No.: 10/218,059

(22) Filed: Aug. 13, 2002

(65) Prior Publication Data

US 2003/0035061 A1 Feb. 20, 2003

(30) Foreign Application Priority Data

Aug. 13, 2001 (JP) .............................. 2001-245593
Feb. 8, 2002 (JP) .............................. 2002-032596

(51) Int. Cl.
*H04N 13/02* (2006.01)
*H04N 15/00* (2006.01)

(52) U.S. Cl. ............................. 348/50; 348/37; 348/39; 348/47; 382/154; 382/285

(58) Field of Classification Search ................ 348/135, 348/139–142, 222.1, 36–39, 42–50; 382/154, 382/285, 289, 287; 396/326–330; 463/32; 702/152, 153; 345/664, 653, 419, 427, 583, 345/679
See application file for complete search history.

(56) References Cited

U.S. PATENT DOCUMENTS 6,288,385 B1 * 9/2001 Miramonti et al. ...... 250/208.1

6,445,814 B2 * 9/2002 Iijima et al. ................. 382/154
7,065,242 B2 * 6/2006 Petrov et al. ................ 382/154
2002/0159628 A1 * 10/2002 Matusik et al. ............. 382/154

FOREIGN PATENT DOCUMENTS

| JP | 10-124704 | 5/1998 |
|----|-----------|--------|
| JP | 11-73491 | 3/1999 |
| JP | 2000-224410 | 8/2000 |

\* cited by examiner

*Primary Examiner*—Vivek Srivastava
*Assistant Examiner*—Nelson D. Hernandez
(74) *Attorney, Agent, or Firm*—Scully, Scott, Murphy & Presser, P.C.

(57) ABSTRACT

A background lighting module illuminates an object from behind by visible light with respect to a photographing module to identify an area including the boundary between the object and the background portion in an image to be photographed by the photographing module. A controller controls a photographing operation including the exposure of the photographing module and the lighting intensity of the background lighting module. An image processing module processes the images photographed by the photographing module. The controller sets the exposure and lighting intensity to specific conditions so as to photograph a processing image where the background portion on the periphery of the object has a higher luminance than that of the silhouette portion of the object. The image processing module extracts the shape of the object by using the luminance difference between the silhouette area of the object and the background area on the periphery of the object.

3 Claims, 25 Drawing Sheets

Image after the completion of cutout

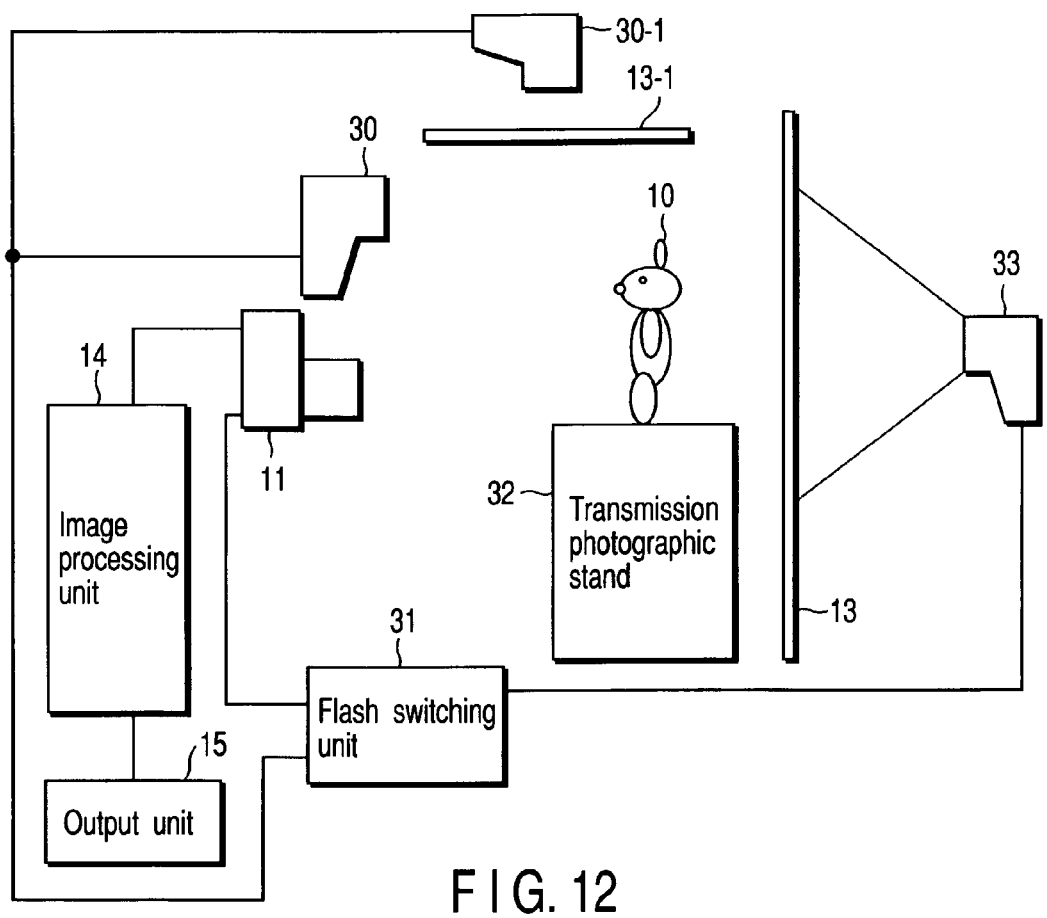
F I G. 12
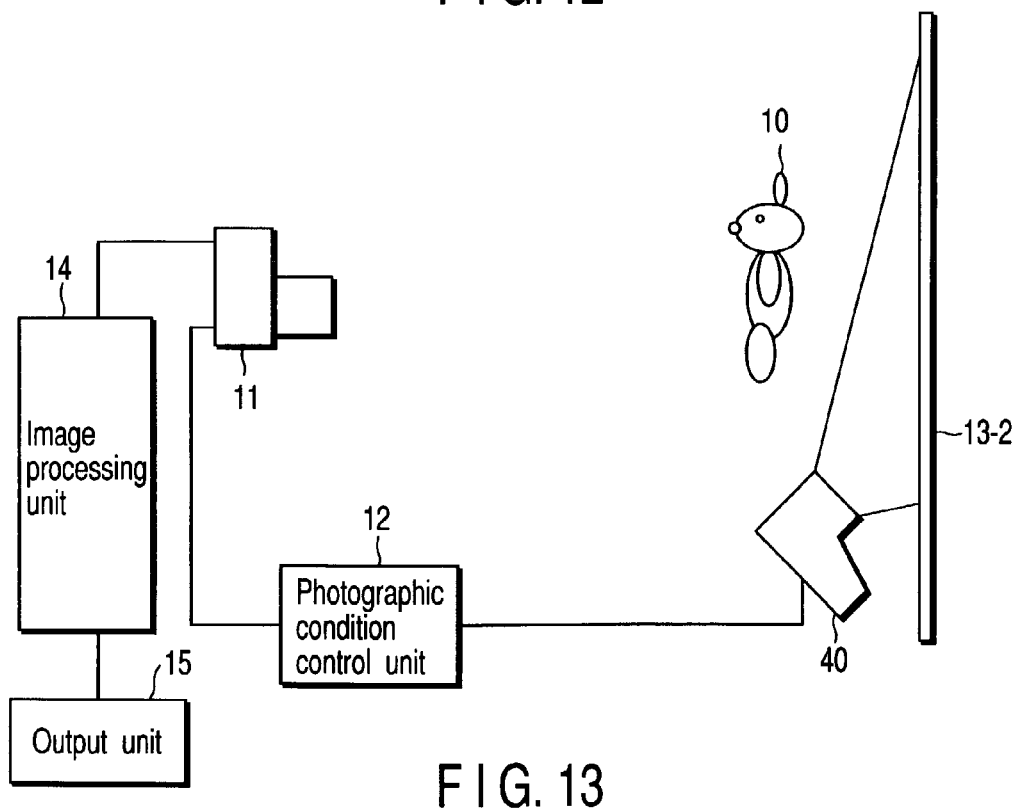
F I G. 13

Reflection of photographic stand 51

Image with background lighting
(Without polarizing filter)

No reflection of photographic stand 51A

Image with background lighting
(With polarizing filter)

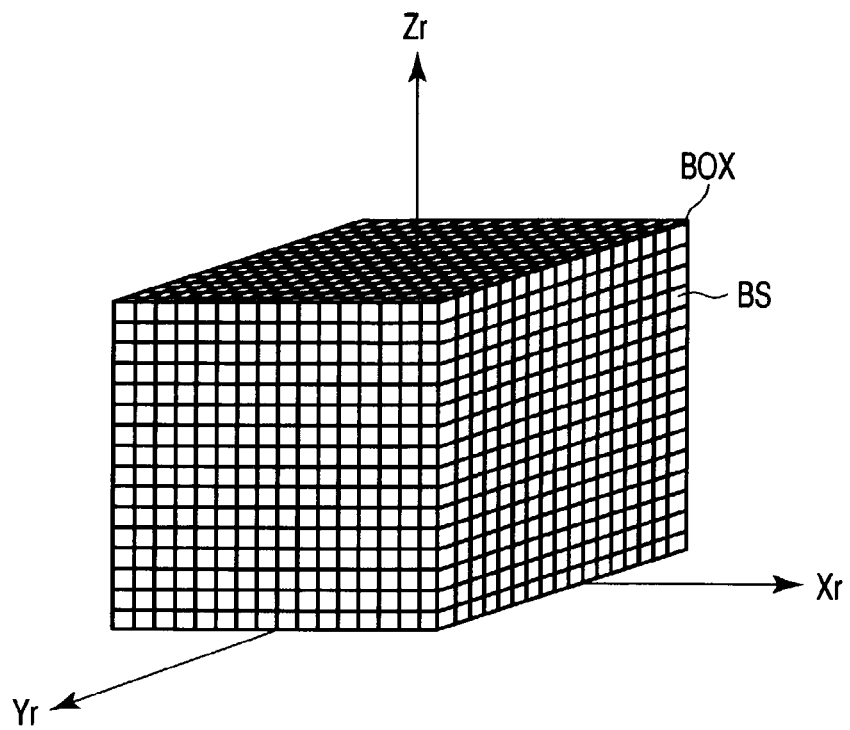
F I G. 30
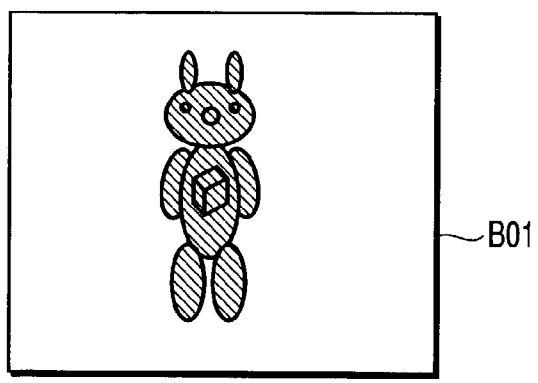
F I G. 31A
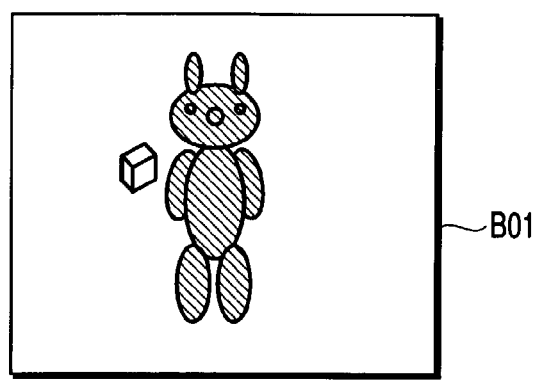
F I G. 31B

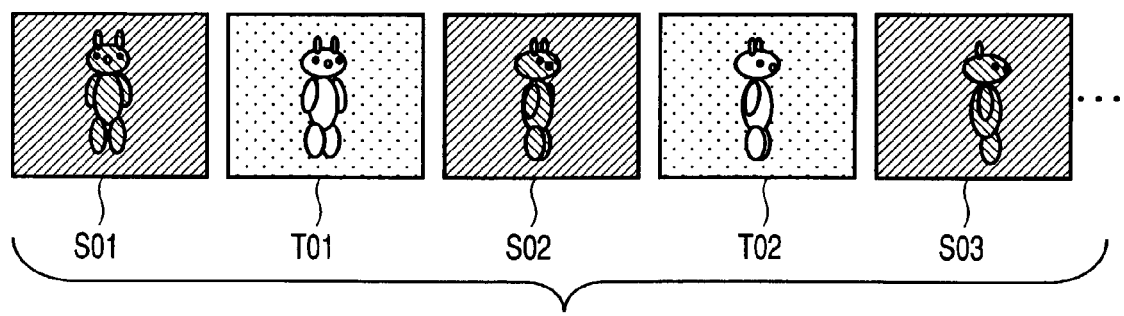
F I G. 39
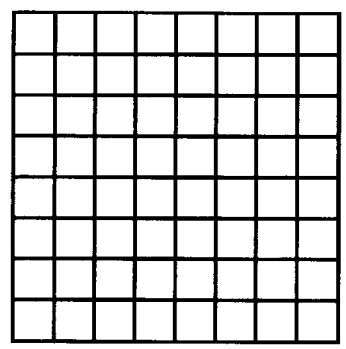
F I G. 40A
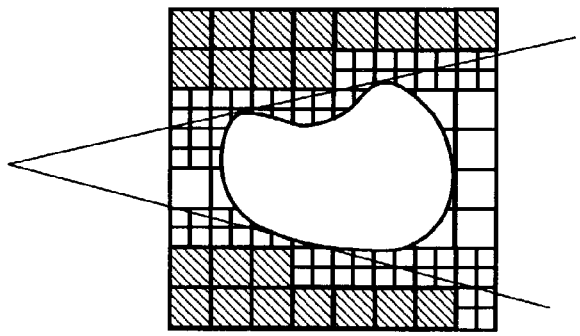
F I G. 40B
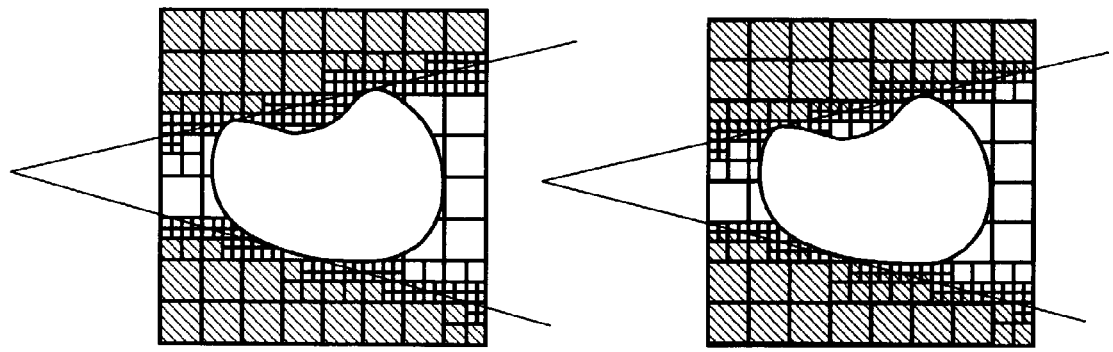
F I G. 40C          F I G. 40D

SHAPE EXTRACTION SYSTEM AND 3-D (THREE DIMENSION) INFORMATION ACQUISITION SYSTEM USING THE SAME

CROSS-REFERENCE TO RELATED APPLICATIONS

This application is based upon and claims the benefit of priority from the prior Japanese Patent Applications No. 2001-245593, filed Aug. 13, 2001; and No. 2002-32596, filed Feb. 8, 2002, the entire contents of both of which are incorporated herein by reference.

BACKGROUND OF THE INVENTION

1. Field of the Invention

This invention relates to a shape extraction system and a 3-D (three dimension) information acquisition system using the shape extraction system, and more particularly to a shape extraction system which extracts the boundary of an object on the basis of a photographic image obtained in a state where background lighting is applied to the object whose two-dimensional image boundary is to be extracted and a photographic image obtained in a state where no background lighting is applied to the object and a 3-D information acquisition system which acquires 3-D information about the object by using the shape extraction system as component techniques.

2. Description of the Related Art

As for a conventional shape extraction system, Jpn. Pat. Appln. KOKAI Publication No. 11-73491 has disclosed an image cutout method using infrared rays as light of a specific wavelength outside the visible light region.

As another conventional shape extraction system, Jpn. Pat. Appln. KOKAI Publication No. 2000-224410 has disclosed a method of determining a cutout area by using a light source with a specific chroma and a specific lightness behind the object, or chromatic techniques.

As still another conventional shape extraction system, Jpn. Pat. Appln. KOKAI Publication No. 10-124704 has disclosed a 3-D information acquisition apparatus.

The 3-D information acquisition apparatus calculates a hypothetical existence area using the boundary between the object and the background in the image.

The hypothetical existence area is a conical area which has the projection center of the camera at the vertex and the shape of whose cross section is the boundary between the object and the background in the image.

The conical area (or hypothetical existence area) is written using a boxel (a model expressed by cubes of a specific size).

The above-described process is carried out repeatedly, as the object is turned through a specific angle by a turntable.

Then, a common hypothetical existence area is determined and 3-D information about the object is acquired.

The boundary between the object and the boundary in the image is determined from the difference between the image obtained by photographing only the background in the absence of the object and the image obtained by photographing the background in the presence of the object.

Since the image cutout method disclosed in Jpn. Pat. Appln. KOKAI Publication No. 11-73491 cuts out the silhouette of an image using infrared rays, the result of cutout might be influenced by the environmental condition, particularly the ambient temperature or the temperature of the object.

Furthermore, the image cutout method requires not only a special light source that emits infrared rays but also a special band-pass filter and a special photographing apparatus, resulting in the disadvantage of making the apparatus expensive.

On the other hand, in the cutout area determining method disclosed in Jpn. Pat. Appln. KOKAI Publication No. 2000-224410 is at a disadvantage in that it is difficult to cut out accurately an object whose chroma is similar to that of the background.

Particularly in the cutout area determining method, when a part of the object is a metal surface (a flat metal surface or a scattering surface similar to this or a part with a relatively high reflectivity), the metal surface part looks the same color as that of the background as a result of reflecting the background (color). This causes the problem of the shape of the object to be recognized erroneously.

In the prior art 3-D information acquisition apparatus disclosed in Jpn. Pat. Appln. KOKAI Publication No. 10-124704, to improve the accuracy of 3-D information, it is necessary to make the specific angle smaller. This increases the number of shootings, causing the problem of increasing the photographing time.

In the 3-D information acquisition apparatus, to set the photographing angle first, the turntable turns and stops repeatedly. This applies acceleration to the object, which might cause the object to overturn or be deformed.

Furthermore, since the stop position of the 3-D information acquisition apparatus must be controlled with high accuracy, this leads to the disadvantages that the moving unit and control unit for the turntable are complex and expensive.

In the 3-D information acquisition apparatus, to determine the boundary between the object and the background in the image, the difference between the image of only the background and the image of the object with the background is used. Because the camera exposure, focus, and shutter speed vary from one shooting to another, this causes the problem that the boundary might not be determined with high accuracy.

Furthermore, in the 3-D information acquisition apparatus, since a common hypothetical existence area is determined directly by using a boxel model, the number of images necessary to determine whether a certain boxel is included in the common hypothetical existence area is large, which leads to the disadvantage that the processing time is very long.

Moreover, in the 3-D information acquisition apparatus, since it is necessary to store the probability of existence related to each of the boxels in the previously set boxel model, this results in the disadvantage that the memory capacity must be very high.

BRIEF SUMMARY OF THE INVENTION

An object of the present invention is to provide a shape extraction apparatus and method which are capable of cutting out an image reliably at low cost and a shape extraction system including an image cutout apparatus and method, and more particularly a shape extraction system using the technique for extracting the boundary of an object on the basis of a photographic image obtained in a state where background lighting is applied to the object whose two-dimensional image boundary is to be extracted and a photographic image obtained in a state where no background lightning is applied to the object.

Another object of the present invention is to provide a 3-D information acquisition apparatus and method which are capable of not only determining the boundary with high accuracy and acquiring high-accuracy 3-D information but also reducing remarkably the memory capacity to acquire 3-D information about an object, shortening the photographing time, and keeping the object stable, and a 3-D information acquisition system including a 3-D information acquisition program, and more particularly a 3-D information acquisition system which acquires 3-D information about the object by using as component techniques a shape extraction system which extracts the two-dimensional boundary of the object on the basis of a photographic image obtained in a state where background lighting is applied to the object whose two-dimensional image boundary is to be extracted and a photographic image obtained in a state where no background lightning is applied to the object.

According to a first aspect of the present invention, there is provided a shape extraction apparatus comprising: a photographing module which photographs an object; a background lighting module which illuminates the object from behind by visible light with respect to the photographing module to identify an area including the boundary between the object and the background portion in an image to be photographed by the photographing module; a control module which controls a photographing operation including the exposure of the photographing module and the lighting intensity of the background lighting module; and an image processing module which processes the image photographed by the photographing module, wherein the control module sets the exposure and lighting intensity to specific conditions so as to photograph a processing image where the background portion on the periphery of the object has a higher luminance than that of the silhouette portion of the object, and the image processing module extracts the shape of the object by using the luminance difference between the silhouette area of the object and the background area on the periphery of the object in the processing image.

According to a second aspect of the present invention, there is provided a shape extraction apparatus according to the first aspect, wherein the background lighting module includes at least a light-source module which emits light in the visible light region and a light scattering module which is provided behind the object with respect to the photographing module and scatters light from the light-source module.

According to a third aspect of the present invention, there is provided a shape extraction apparatus according to the second aspect, wherein a scattered light radiation area where the light scattering module radiates scattered light includes an area corresponding to the boundary between the object and the background portion in the image photographed by the photographing module.

According to a fourth aspect of the present invention, there is provided a shape extraction apparatus according to the first aspect, wherein the processing image is a silhouette image photographed in such a manner that the object is darker than the background.

According to a fifth aspect of the present invention, there is provided a shape extraction apparatus according to the first aspect, further comprising an object placing module on which the object is placed and which transmits light from the background lighting module.

According to a sixth aspect of the present invention, there is provided a shape extraction method comprising: photographing an object; illuminating the object from behind by visible light to identify an area including the boundary between the object and the background portion in an image to be photographed; controlling a photographing operation including the exposure in photographing the object and the lighting intensity of the lighting; and processing the photographed image, wherein the control sets the exposure and lighting intensity to specific conditions so as to photograph a processing image where the background portion on the periphery of the object has a higher luminance than that of the silhouette portion of the object, and the processing extracts the shape of the object by using the luminance difference between the silhouette area of the object and the background area on the periphery of the object in the processing image.

According to a seventh aspect of the present invention, there is provided an image cutout apparatus comprising: a photographing module which photographs an object; a background lighting module which illuminates the object from behind by visible light with respect to the photographing module to identify an area including the boundary between the object and the background portion in an image to be photographed by the photographing module; a control module which controls a photographing operation including the exposure of the photographing module and the lighting intensity of the background lighting module; an image processing module which processes the image photographed by the photographing module; and a storage module which stores the image processed by the image processing module, wherein the control module acquires a first image obtained by setting the photographing module to a first specific exposure and photographing the object, and a second image obtained by lighting the background lighting module at a specific lighting intensity, setting the photographing module to the first specific exposure or a second specific exposure different from the first specific exposure, and photographing the object, the image processing module extracts the shape of the object by using the luminance difference between the silhouette portion of the object and the background portion on the periphery of the object in the second image and creates a third image by cutting out an image of a part corresponding to the object from the first image on the basis of the extracted shape, and the storage module stores the third image.

According to an eighth aspect of the present invention, there is provided an image cutout apparatus according to the seventh aspect, further comprising a normal lighting module which illuminates the side to be photographed of a subject, wherein the first image is photographed with lighting by the normal lighting module.

According to a ninth aspect of the present invention, there is provided an image cutout apparatus according to the seventh or eighth aspect, wherein the background lighting module includes at least a light source module which emits light in the visible light region and a light scattering module which is provided behind the object with respect to the photographing module and scatters light from the light source module.

According to a tenth aspect of the present invention, there is provided an image cutout apparatus according to the seventh or eighth aspect, wherein a scattered light radiation area where the light scattering module radiates scattered light includes an area corresponding to the boundary between the object and the background portion in the image photographed by the photographing module.

According to an eleventh aspect of the present invention, there is provided an image cutout apparatus according to the seventh or eighth aspect, wherein the second image is such that the background portion on the periphery of the object has a higher luminance than that of the silhouette portion of the object.

According to a twelfth aspect of the present invention, there is provided an image cutout apparatus according to the seventh or eighth aspect, wherein the second image is a silhouette image of the object.

According to a thirteenth aspect of the present invention, there is provided an image cutout apparatus according to the seventh or eighth aspect, further comprising an object placing module on which the object is placed and which transmits light from the background lighting module.

According to a fourteenth aspect of the present invention, there is provided a 3-D information acquisition apparatus comprising: a photographing module which photograph an image of an object; a relative movement module which moves the object and the photographing module relatively and continuously in such a manner that the photographing module can photograph images of the object from a plurality of viewpoints; a relative position sensing module which senses the relative position of the object and the photographing module at each of the viewpoints at which images of the object are photographed by the photographing module from a plurality of viewpoints; and a 3-D shape estimating module which estimates a 3-D shape of the object by using the images of the object photographed by the photographing module from a plurality of viewpoint and information about the relative position sensed by the relative position sensing module.

According to a fifteenth aspect of the present invention, there is provided a 3-D information acquisition apparatus comprising: a photographing module which photograph an image of an object; a background module which has a specific optical characteristic and which is provided behind the object and becomes the background of the object in photography; a relative movement module which moves the object and the photographing module relatively and continuously in such a manner that the photographing module can photograph images of the object from a plurality of viewpoints; a relative position sensing module which senses the relative position of the object and the photographing module at each of the viewpoints at which images of the object are photographed by the photographing module from a plurality of viewpoints; and a 3-D shape estimating module which recognizes the areas occupied by the object in the images photographed by the photographing module from the plurality of viewpoints by using the images of the object photographed by the photographing module from the plurality of viewpoints and information about the relative position sensed by the relative position sensing module and which estimates a 3-D shape of the object by using the areas occupied by the object.

According to a sixteenth aspect of the present invention, there is provided a 3-D information acquisition apparatus comprising: a photographing module which photograph an image of an object; a background lighting module which illuminates, directly or indirectly from behind the object, a range including at least all of the silhouette portion of the object or a part of the silhouette portion in the photographing range of the photographing module; a relative movement module which moves the object and the photographing module relatively and continuously in such a manner that the photographing module can photograph images of the object from a plurality of viewpoints; a relative position sensing module which senses the relative position of the object and the photographing module at each of the viewpoints at which images of the object are photographed by the photographing module from a plurality of viewpoints; and a 3-D shape estimating module which recognizes an area occupied by the object in each of the images photographed by the photographing module from the plurality of viewpoints by using the images of the object photographed by the photographing module from the plurality of viewpoints and information about the relative position sensed by the relative position sensing module and which estimates a 3-D shape of the object by using the areas occupied by the object, wherein the background lighting module is turned on in photographing an image used to recognize the area occupied by the object.

According to a seventeenth aspect of the present invention, there is provided a 3-D information acquisition apparatus according to the fifteenth or sixteenth aspect, wherein the relative movement module rotates the object.

According to an eighteenth aspect of the present invention, there is provided a 3-D information acquisition apparatus according to the seventeenth aspect, wherein the relative movement module rotates the object almost at a constant angular speed.

According to a nineteenth aspect of the present invention, there is provided a 3-D information acquisition apparatus according to the seventeenth aspect, wherein the relative movement module moves the object in a direction parallel with the axis of rotation.

According to a twentieth aspect of the present invention, there is provided a 3-D information acquisition apparatus according to the seventeenth, wherein the relative movement module rotates the object at a constant angular speed, and the relative position sensing module includes a reference angular position sensing module which senses a reference angular position, a time difference computing module which calculates the time difference between the time the reference angular position sensing module senses a reference angular position and the time the photographing module photographs, and an angle difference determining module which determines the angle difference between the reference angle and the angle through which a turn is made until the photographing module photographs by using the constant angular speed and the result obtained at the time difference computing module.

According to a twenty-first aspect of the present invention, there is provided a 3-D information acquisition apparatus according to the sixteenth aspect, wherein the image obtained by the 3-D shape estimating module in photographing to estimate a 3-D shape of the object is a silhouette image where the area occupied by the object is darker than the background portion near the silhouette of the object.

According to a twenty-second aspect of the present invention, there is provided a 3-D information acquisition apparatus according to the twenty-first aspect, wherein the 3-D shape estimating module extracts the silhouette of the object by using the luminance difference between the silhouette area of the object and the background area on the periphery of the object in the silhouette image and estimates the area occupied by the object by using the extracted silhouette.

According to a twenty-third aspect of the present invention, there is provided a 3-D information acquisition apparatus according to the sixteenth aspect, wherein the background lighting module includes at least a light source module which emits light in the visible light region, and a light scattering module which is provided behind the object with respect to the photographing module and scatters light from the light source module.

According to a twenty-fourth aspect of the present invention, there is provided a 3-D information acquisition apparatus according to the sixteenth aspect, wherein the 3-D shape estimating module estimates the texture of the surface of the object by using a texture image of the object photographed at least once by the photographing module in a state where the background lighting module does not illuminate the object.

According to a twenty-fifth aspect of the present invention, there is provided a 3-D information acquisition apparatus according to the fifteenth or sixteenth aspect, wherein the 3-D shape estimating module includes a closed area setting module which sets in the object a set of closed areas arranged closely in a three-dimensional space, and a closed-area outside determining module which determines whether the closed area exists outside the object by calculating the probability that each of the closed areas will exist outside the object on the basis of the images obtained by photographing the object by the photographing module from a plurality of viewpoints, and the closed area is removed from the subsequent closed areas to be determined at the closed-area outside determining module, when the closed-area outside determining module determines that the probability that the closed area will exist outside the object exceeds a specific threshold value.

According to a twenty-sixth aspect of the present invention, there is provided a 3-D information acquisition apparatus according to the fifteenth or sixteenth aspect, wherein the 3-D shape estimating module carries out a recognition and estimation process of not only recognizing the area occupied by the object on the basis of the image photographed with a visual line from a first viewpoint among the images photographed by the photographing module from a plurality of viewpoints but also estimating a 3-D shape of the object, and then carries out a recognition and estimation process of not only recognizing the area occupied by the object on the basis of the image photographed with a visual line from a second viewpoint farthest from the first viewpoint but also estimating the 3-D shape of the object, and thereafter repeats the recognition and estimation process using the image from the viewpoint closest to the angle in which the angle difference is interpolated among the remaining ones of the viewpoints corresponding to the image not used in the recognition and estimation process and being sandwiched between visual lines producing the largest angle difference corresponding to the two images used in the recognition and estimation process.

According to a seventeenth aspect of the present invention, there is provided a 3-D information acquisition apparatus according to the fifteenth or sixteenth aspect, wherein the 3-D shape estimating module includes a boundary closed area determining module which determines whether the probability that a closed area belonging to the set of closed areas will exist outside the object reaches a specific probability range and whether the closed area exists near the boundary between the inside and outside of the object, and a boundary closed area dividing module which divides the closed area determined to be a closed area existing near the boundary by the boundary closed area determining module, into subdivision closed areas, and causes the boundary closed area determining module to determine further whether the subdivision closed areas divided by the boundary closed area dividing module exist near the boundary, causes the boundary closed area dividing module to subdivide the subdivision closed areas on the basis of the result of the determination, and repeats the determination by the boundary closed area determining module and the division by the boundary closed area dividing module until the closed areas have a specific size.

According to a twenty-eighth aspect of the present invention, there is provided a 3-D information acquisition method of using the images obtained by photographing an object from a plurality of viewpoints and information about the positions of the viewpoints to recognize the areas occupied by the object in the images, estimating a 3-D shape of the object on the basis of the areas occupied by the object, and acquiring 3-D information about the object, the 3-D information acquisition method comprising: setting in the object a set of closed areas arranged closely in a three-dimensional space; determining whether the closed area exists outside the object by finding the probability that each of the closed areas will exist outside the object on the basis of the images obtained by photographing the object from a plurality of viewpoints; and removing the closed area from the remaining ones of the closed areas to be determined as to whether they exist outside the object, when determining that the probability that the closed area will exist outside the object exceeds a specific threshold value.

According to a twenty-ninth aspect of the present invention, there is provided a 3-D information acquisition method of using the images obtained by photographing an object from a plurality of viewpoints and information about the positions of the viewpoints to recognize the areas occupied by the object in the images, estimating a 3-D shape of the object on the basis of the areas occupied by the object, and acquiring 3-D information about the object, the 3-D information acquisition method comprising: carrying out a first recognition and estimation process of not only recognizing the area occupied by the object on the basis of the image photographed with a visual line from a first viewpoint among the images photographed from the plurality of viewpoints but also estimating a 3-D shape of the object; carrying out a second recognition and estimation process of not only recognizing the area occupied by the object on the basis of the image photographed with a visual line from a second viewpoint farthest from the first viewpoint but also estimating the 3-D shape; and thereafter carrying out a third recognition and estimation process similar to the first and second recognition and estimation processes by using the image from the viewpoint closest to the angle in which the angle difference is interpolated among the remaining ones of the viewpoints corresponding to the images not used in the first and second recognition and estimation processes and being sandwiched between visual lines producing the largest angle difference corresponding to the two images used in the first and second recognition and estimation processes; and carrying out a fourth recognition and estimation process of repeating the third recognition and estimation process.

According to a thirtieth aspect of the present invention, there is provided a 3-D information acquisition method of using the images obtained by photographing an object from a plurality of viewpoints and information about the positions of the viewpoints to recognize the areas occupied by the object in the images, estimating a 3-D shape of the object on the basis of the areas occupied by the object, and acquiring 3-D information about the object, the 3-D information acquisition method comprising: setting in the object a set of closed areas arranged closely in a three-dimensional space; determining whether the probability that a closed area belonging to the set of closed areas will exist outside the object reaches a specific probability range and whether the closed area exists near the boundary between the inside and outside of the object; and dividing the closed area determined to be a closed area existing near the boundary into subdivision closed areas, wherein the subdivision closed areas are subjected to the process of determining whether they are closed areas existing near the boundary and the process of further dividing the closed areas into subdivision closed areas, until the closed areas have a specific size.

According to a thirty-first aspect of the present invention, there is provided a 3-D information acquisition program which causes a computer to use the images obtained by photographing an object from a plurality of viewpoints and information about the positions of the viewpoints to recognize the areas occupied by the object in the images, estimate a 3-D shape of the object on the basis of the areas occupied by the object, and acquire 3-D information about the object, the 3-D information acquisition program comprising: a closed-area setting step of causing the computer to set in the object a set of closed areas arranged closely in a three-dimensional space; a closed-area outside determining step of causing the computer to determine whether the closed area exists outside the object by finding the probability that each of the closed areas will exist outside the object on the basis of the images obtained by photographing the object from a plurality of viewpoints, and a step of causing the computer to remove the closed area from the remaining ones of the closed areas to be subjected to the closed-area outside determining step, when the closed-area outside determining step determines that the probability that the closed area will exist outside the object exceeds a specific threshold value.

According to a thirty-second aspect of the present invention, there is provided a 3-D information acquisition program which causes a computer to use the images obtained by photographing an object from a plurality of viewpoints and information about the positions of the viewpoints to recognize the areas occupied by the object in the images, estimate a 3-D shape of the object on the basis of the areas occupied by the object, and acquire 3-D information about the object, the 3-D information acquisition program comprising: a first recognition and estimation processing step of causing the computer to not only recognize the area occupied by the object on the basis of the image photographed with a visual line from a first viewpoint among the images photographed from the plurality of viewpoints but also estimate a 3-D shape of the object; a second recognition and estimation processing step of causing the computer to not only recognize the area occupied by the object on the basis of the image photographed with a visual line from a second viewpoint farthest from the first viewpoint but also estimate a 3-D shape of the object; a third recognition and estimation processing step of causing the computer to carry out the recognition and estimation process by using the image from the viewpoint closest to the angle in which the angle difference is interpolated among the remaining ones of the viewpoints corresponding to the image not used in the first and second recognition and estimation processes and being sandwiched between visual lines producing the largest angle difference corresponding to the two images used in the first and second recognition and estimation processes; and a fourth recognition and estimation processing step of causing the computer to carry out the third recognition and estimation processing step repeatedly.

According to a thirty-third aspect of the present invention, there is provided a 3-D information acquisition program which causes a computer to use the images obtained by photographing an object from a plurality of viewpoints and information about the positions of the viewpoints to recognize the areas occupied by the object in the images, estimate a 3-D shape of the object on the basis of the areas occupied by the object, and acquire 3-D information about the object, the 3-D information acquisition program comprising: a closed area setting step of causing the computer to set in the object a set of closed areas arranged closely in a three-dimensional space; a boundary closed area determining step of causing the computer to determine whether the probability that a closed area belonging to the set of closed areas will exist outside the object reaches a specific probability range and whether the closed area exists near the boundary between the inside and outside of the object; a boundary closed area dividing step of causing the computer to divide the closed area determined to be a closed area existing near the boundary in the closed area determining step, into subdivision closed areas; and a step of causing the computer to subject the subdivision closed areas to the boundary closed area determining step and the boundary closed area dividing step, until the closed areas have a specific size.

According to a thirty-fourth aspect of the present invention, there is provided a 3-D information acquisition apparatus comprising: a photographing module which photographs an image of an object; a relative movement module which moves the object and the photographing module relatively in such a manner that the photographing module can photograph images of the object from a plurality of viewpoints; a photographing control module which gives not only a photographing instruction to the photographing module but also a moving instruction to the relative movement module; a relative position sensing module which senses the relative position of the object and the photographing module at each of the viewpoints at which the object is photographed by the photographing module from a plurality of viewpoints, on the basis of the signal from the photographing module; and a 3-D shape estimating module which estimates a 3-D shape of the object by using the images of the object photographed by the photographing module from a plurality of viewpoints and information about the relative position sensed by the relative position sensing module.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 shows a case where a camera in the shape extraction system of the second embodiment is provided with two subject lighting flashes;

FIG. 13 shows a case where a background lighting light source in the shape extraction system of the second embodiment is placed in front of a scattering reflector;

FIG. 30 shows a boxel BOX applied to the twelfth embodiment;

FIGS. 31A and 31B show an example of external determination applied to the twelfth embodiment;

FIG. 39 shows photographic images applied to the 3-D information acquisition system of the fifteenth embodiment;

FIGS. 40A to 40D are drawings to help explain how a boxel changes in a 3-D information acquisition system according to a sixteenth embodiment of the present invention;

DETAILED DESCRIPTION OF THE INVENTION

Figure 1:
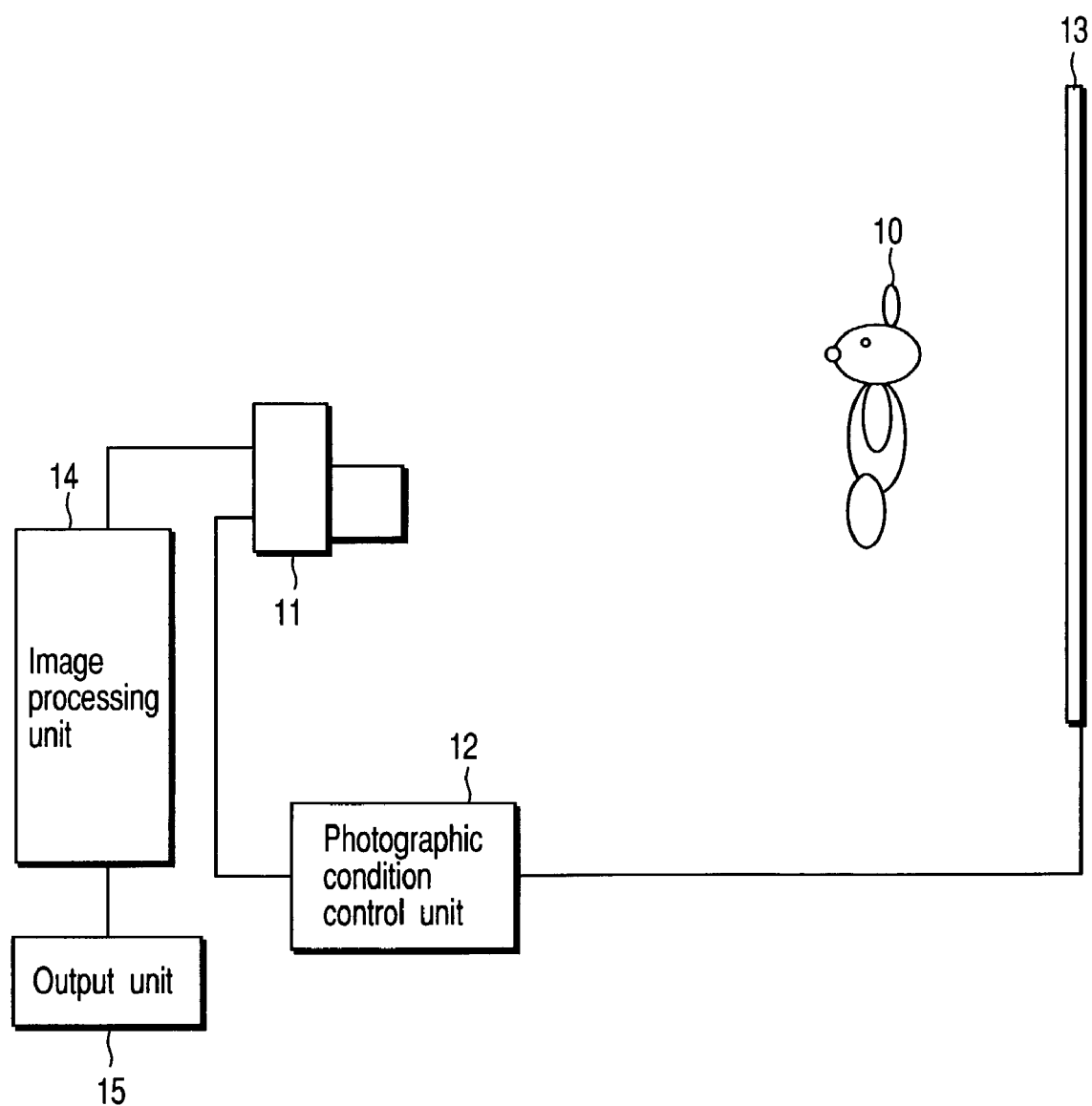
FIG. 1 shows a basic configuration of a shape extraction system according to a first embodiment of the present invention.

Reference will now be made in detail to the presently preferred embodiments of the invention as illustrated in the accompanying drawings, in which like reference numerals designate like or corresponding parts.

FIRST EMBODIMENT

FIG. 1 shows a basic configuration of a shape extraction system according to a first embodiment of the present invention;

As shown in FIG. 1, in the shape extraction system of the first embodiment, a surface light-emitting light source 13 serving as a background lighting module is provided behind an object 10 to be photographed.

The surface light-emitting light source 13 is connected to a photographic condition control unit 12.

The photographic condition control unit 12 is connected to a camera 11 located in front of the object 10.

The camera 11 is connected via an image processing unit 14 to an output unit 15.

The surface light-emitting light source 13 emits visible scattered light and illuminates the whole of the object 10 from behind.

The photographic condition control unit 12 controls the photographing operation of the camera 11 and its exposure condition and the light-emitting operation and light-emitting intensity of the surface light-emitting light source 13.

In a state where a specific condition is set and the surface light-emitting light source 13 is turned on, that is, in a state where background lighting is applied to the object 10, the photographic condition control unit 12 performs such control as acquires a first image (silhouette image) obtained by photographing the object 10 with the camera 11.

Furthermore, in a state where a specific condition is set and the surface light-emitting light source 13 is turned off, that is, in a state where no background lighting is applied to the object 10, the photographic condition control unit 12 performs such control as acquires a second image obtained by photographing the object 10 with the camera 11.

In the shape extraction system of the present invention, the shape of the object is extracted on the basis of the first image (silhouette image) and second image obtained as described above.

That is, in the present invention, the shape of the object 10 is recognized on the basis of the first image (silhouette image) and a cutout mask is formed. Using this mask, an object area is cut out from the second image.

The photographic condition (the relationship between the luminance of the light source and the exposure of the camera) for acquiring the first image (silhouette image) will be explained by reference to FIGS. 2 to 4.

Figure 2:
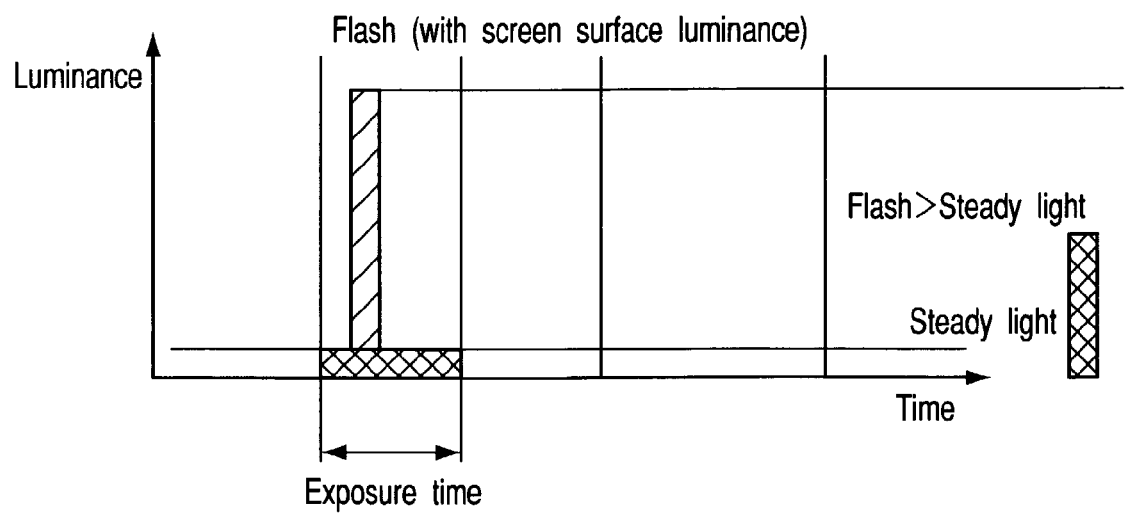
FIG. 2 shows the relationship between the luminance time of a surface light-emitting light source and the ambient light source in the shape extraction system of the first embodiment.
Figure 3:
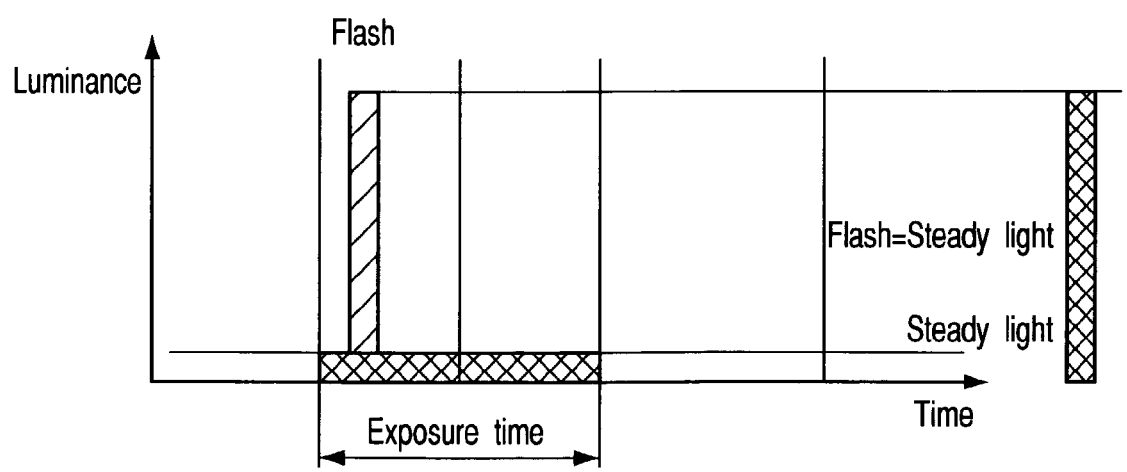
FIG. 3 shows the relationship between the luminance time of a surface light-emitting light source and the ambient light source in the shape extraction system of the first embodiment.
Figure 4:
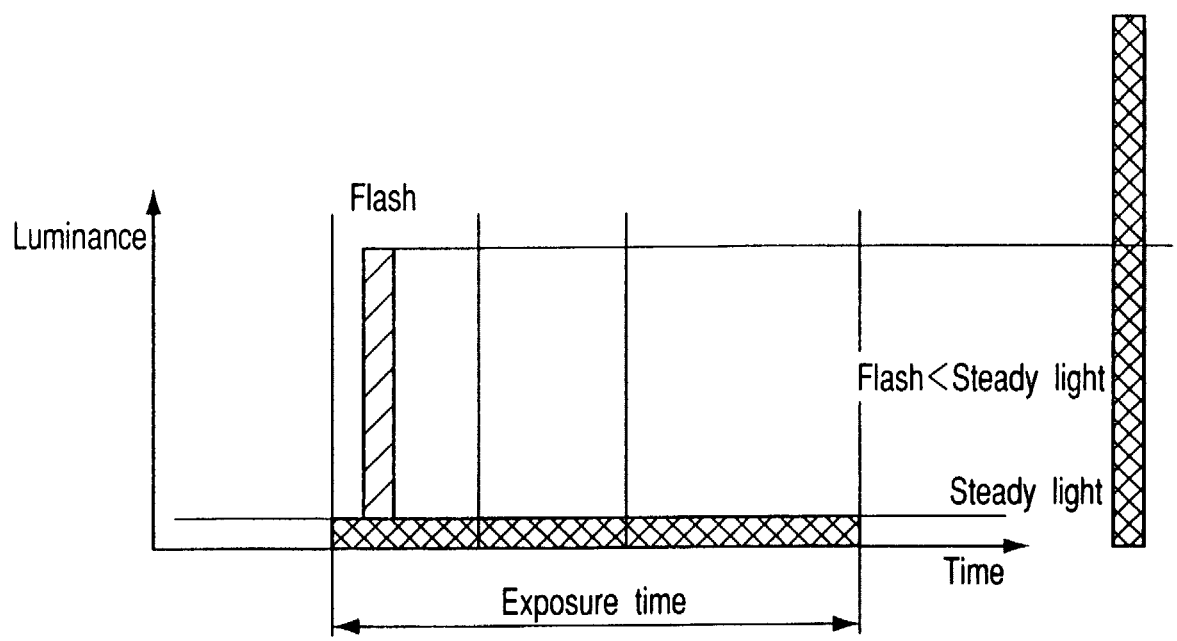
FIG. 4 shows the relationship between the luminance time of a surface light-emitting light source and the ambient light source in the shape extraction system of the first embodiment.

A flash in FIGS. 2 to 4 means light emitted from the surface light-emitting light source 13. In the first embodiment, it is assumed that the photographic condition control unit 12 causes the surface light-emitting light source 13 to emit light with a specific intensity for a specific time.

Ambient light in FIGS. 2 to 4 means light from the lighting light source in the room, for example, when photographing is done in a room.

FIG. 2 shows a case where a flash is higher than the ambient light in a case where photographing is done with the camera being set to a specific exposure by the photographic condition control unit 12.

In this case, a preferable first image (silhouette image) for cutting out the shape of the object 10 is obtained.

FIG. 3 shows a case where the shutter speed of the camera 11 is made slower according to the specific exposure condition of FIG. 2, thereby making the flash almost equal to the ambient light.

FIG. 4 shows a case where the exposure time of FIG. 3 is made much slower and the flash is lower than the ambient light.

Although it is not that the shape of the object 10 cannot be cut out at all under the conditions of FIGS. 3 and 4, they are undesirable to obtain a preferable first image (silhouette image) for cutting out the shape of the object 10.

To pick up a first image (silhouette image) preferable for cutting out the shape of the object 10, the photographic condition control unit 12 sets the exposure of the camera 11 and the tuning on of the surface light-emitting light source 13 according to the condition of FIG. 2.

It goes without saying that the light from the surface light-emitting light source 13 is controlled so as not to permit overexposure to cause flares or ghosts in the pickup image.

By setting the above photographic conditions, a silhouette image is obtained. To recognize the shape of the object 10 from the silhouette image, the image processing unit 14 binarizes the image.

Using FIGS. 5A, 5B, and 5C, a binarized image acquisition method in the first embodiment will be explained.

Figure 5A:
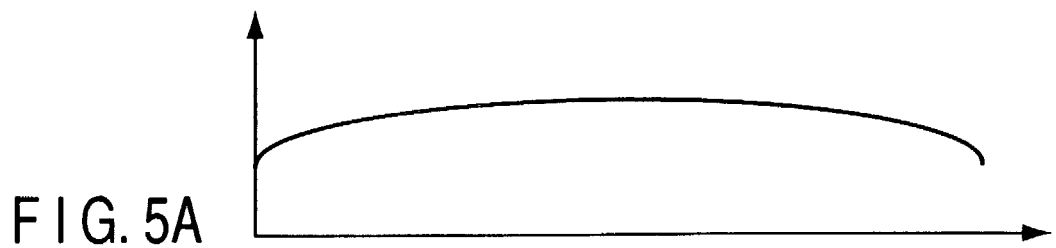
FIGS. 5A to 5C are diagrams to help explain a background light modeling by curve fitting related to the shape extraction system of the first embodiment and a cutout method using the modeling.
Figure 5B:
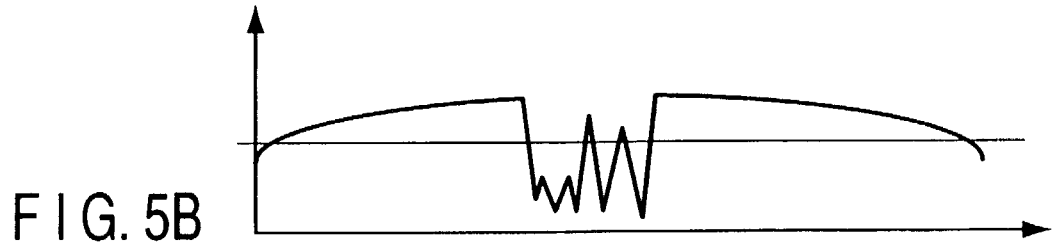
Figure 5C:
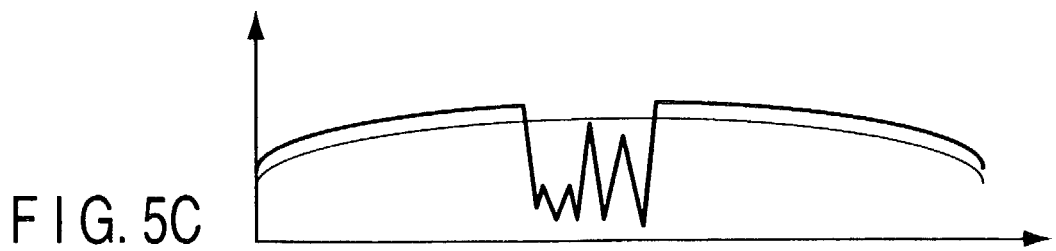

FIGS. 5A, 5B, and 5C are diagrams to help explain a background light modeling by curve fitting and a cutout method using the background light modeling.

First, the distribution of background lighting light is measured as shown in FIG. 5A.

For example, as shown in FIG. 5B, binarization is performed with a specific threshold value, regardless of the object and the background curve. Therefore, if the contrast between the object and the background is insufficient, the object cannot be cut out.

In the first embodiment, however, as shown in FIG. 5C, use of a background light modeling by curve fitting that performs a binarization process using a threshold value that draws a parabolic curve makes it possible to cut out even an object that is not contrasted with the background, to a certain extent.

FIGS. 6A to 6E are drawings to help explain a method of creating light-source modeling.

Figure 6A:
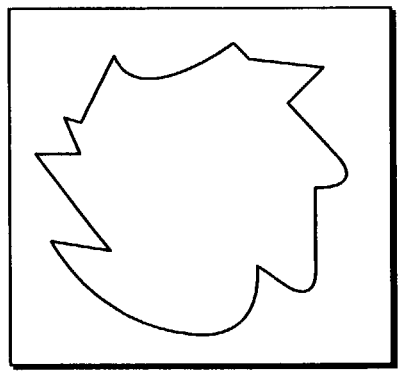
FIGS. 6A to 6E show a method of creating a light source modeling in the shape extraction system of the first embodiment.
Figure 6B:
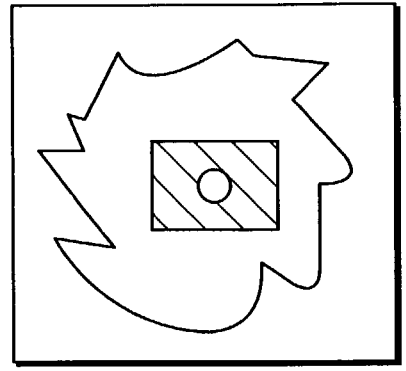
Figure 6C:
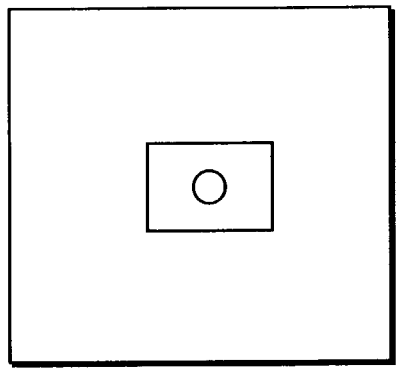

FIGS. 6A to 6C are diagrams to help explain a method of photographing an image without an object.

Figure 6D:
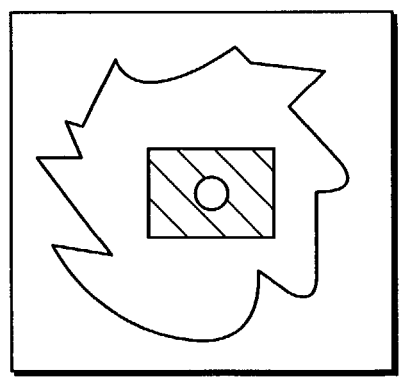
Figure 6E:
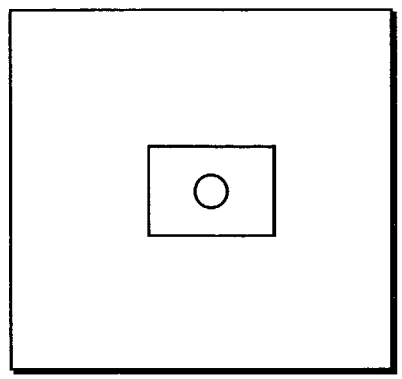

FIGS. 6D and 6E are diagrams to help explain a method of photographing an image when background light modeling is performed using an image with an object.

First, as shown in FIG. 6A, photographing is done with no object in the presence of a flash (e.g., a surface light-emitting light source).

Next, as shown in FIG. 6B, an object to be photographed is placed and photographed with the camera 11 in the presence of the flash.

Finally, as shown in FIG. 6C, the object to be photographed is placed and is photographed with the camera 11 in the absence of the flash.

The details of subsequent processes, including image cutout, will be explained later.

In the method of photographing an image when an image with no object is not used for background light modeling, the process of FIG. 6A is not used and only the processes of FIGS. 6D and 6E similar to those of FIGS. 6B and 6C are carried out.

On the assumption that an image is positioned on the x-axis and the y-axis, the intensity f(x, y) is determined using the following equation:

$$f(x,y)=ax^2+by^2+cx+dy+exy+f$$

where parameters a, b, c, d, e, f are determined using, for example, a parameter estimation method, such as a method of least squares.

In this example, although quadratic surface approximation is used in light source modeling, for example, a Nurb curve or a linear model may be used in the modeling.

In image processing means, if f(x, y) is used as a light source model and I(x, y) is the pixel value of a silhouette (a photographing image where the object photographed with a light source is dark), and T(0 to 1) is a threshold value, cutout can be performed by using the following expression:

$$\{f(x,y)-I(x,y)\}/f(x,y) > T$$

Figure 7:
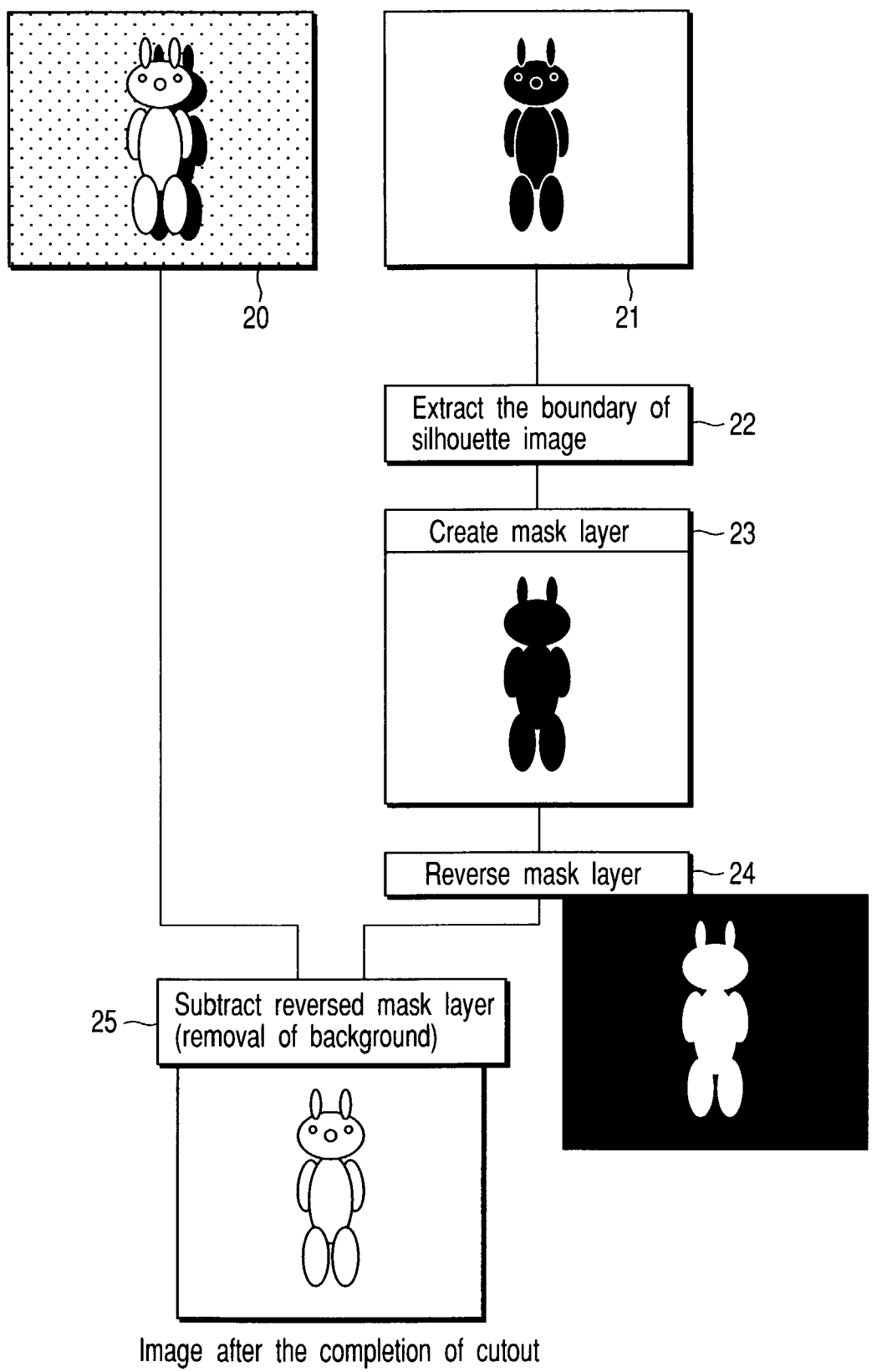
FIG. 7 is drawings to help explain the process of cutting out an image in the shape extraction system of the first embodiment.

FIG. 7 is drawings to help explain an image cutout process.

First, photographing is done with the camera 11, while the surface light-emitting light source 13 is emitting light.

At this time, the object becomes a dark image (or silhouette image) as shown in step 21.

Next, another image is photographed with the camera 11 in a state where the surface light-emitting light source 13 is prevented from emitting light.

At this time, the photographic image is the same as a normally photographed image. A color photographed image is represented in color.

Then, an image (silhouette image) photographed in a state where the surface light-emitting light source 13 is emitting is used to extract the edge or the boundary in step 22.

The extraction may be realized by the cutout function of an ordinary image application program, using the result of the shape extraction.

Next, in step 23, a silhouette of an image, called a mask layer, is created.

Then, after the mask layer is reversed in step 24, the image obtained by reversing the mask layer in step S25 and the image photographed in the state where the surface light-emitting light source 13 is stopped from emitting light are subjected to the prior art reversed mask layer subtraction.

As a result, the background is removed and the cutout of object is completed.

As described above, the first embodiment has the advantages of being less liable to be affected by the temperature of the object and the ambient temperature than a conventional method using infrared rays and of requiring neither a special light source nor a special photographing unit.

Since the conventional method using infrared rays uses a non-visible light source, it is difficult to make adjustments in assembly, manufacture, and installation. For example, lighting position adjustments take a lot time.

In contrast, the first embodiment is based on the assumption that white visible light is used, so that it is easy to do the assembly and adjustment, etc.

Furthermore, the first embodiment can cope with a case where the background color coincides with the color of the object, which was a problem in a conventional chromatic method, there is no need to change the background color in response to the color of the object.

SECOND EMBODIMENT

Figure 8:
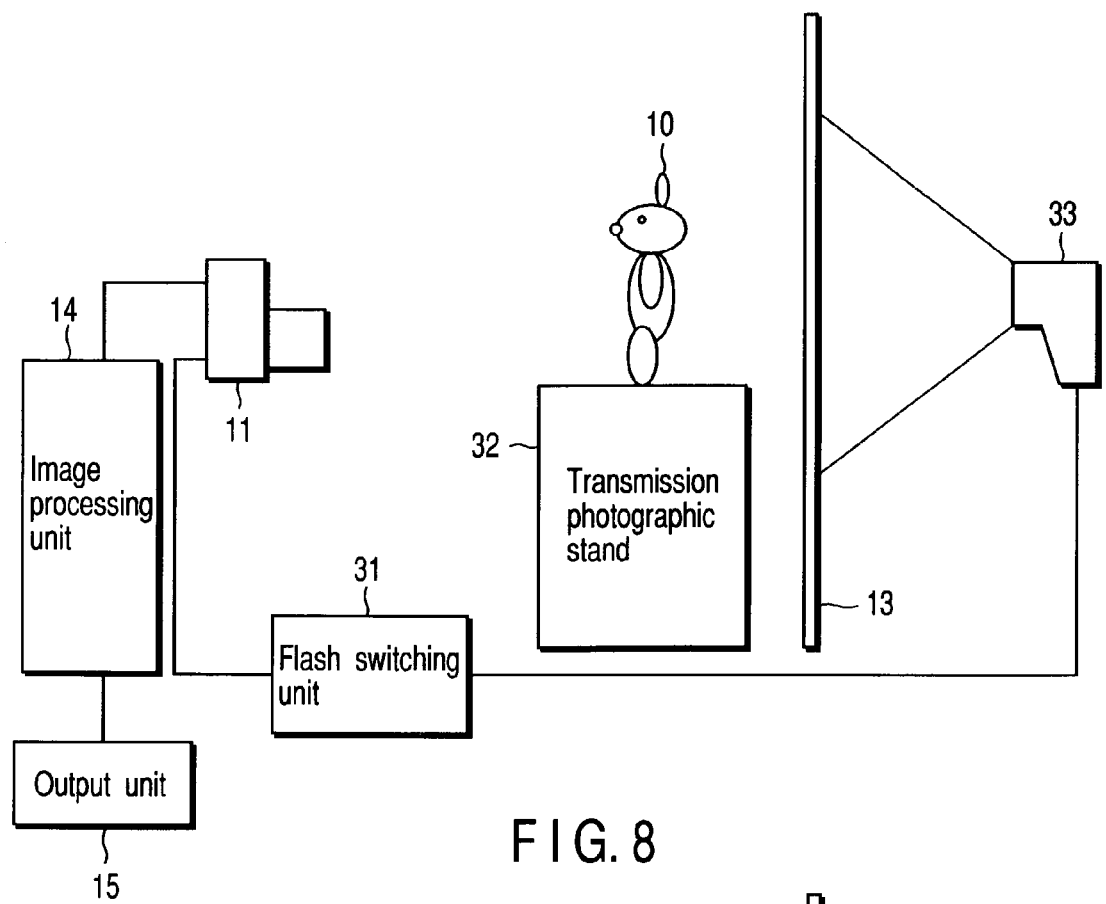
FIG. 8 shows a case where a transparent photographic stand and a flash are used in the shape extraction system of the first embodiment.

FIG. 8 shows a basic configuration of a shape extraction system according to a second embodiment of the present invention.

The second embodiment has the same configuration as that of FIG. 1 except that a transparent photographic stand 32 on which the object is placed and a background lighting flash 33 in addition to the surface light-emitting light source 13 are used.

Specifically, in the second embodiment, the object 10 is placed on the transparent photographic stand 32 as shown in FIG. 8.

This enables the object 10 to be fixed easily. Use of the transparent photographic stand 32 makes it difficult for the stand 32 to appear on the silhouette image and enables the stand 32 to be removed as the background. That is, unwanted items will not appear on the image (which will be explained later).

In the second embodiment, in addition to the surface light-emitting light source 13, a flash 33 may be used.

The second embodiment can carry out the same processes as those in the first embodiment.

THIRD EMBODIMENT

Figure 9:
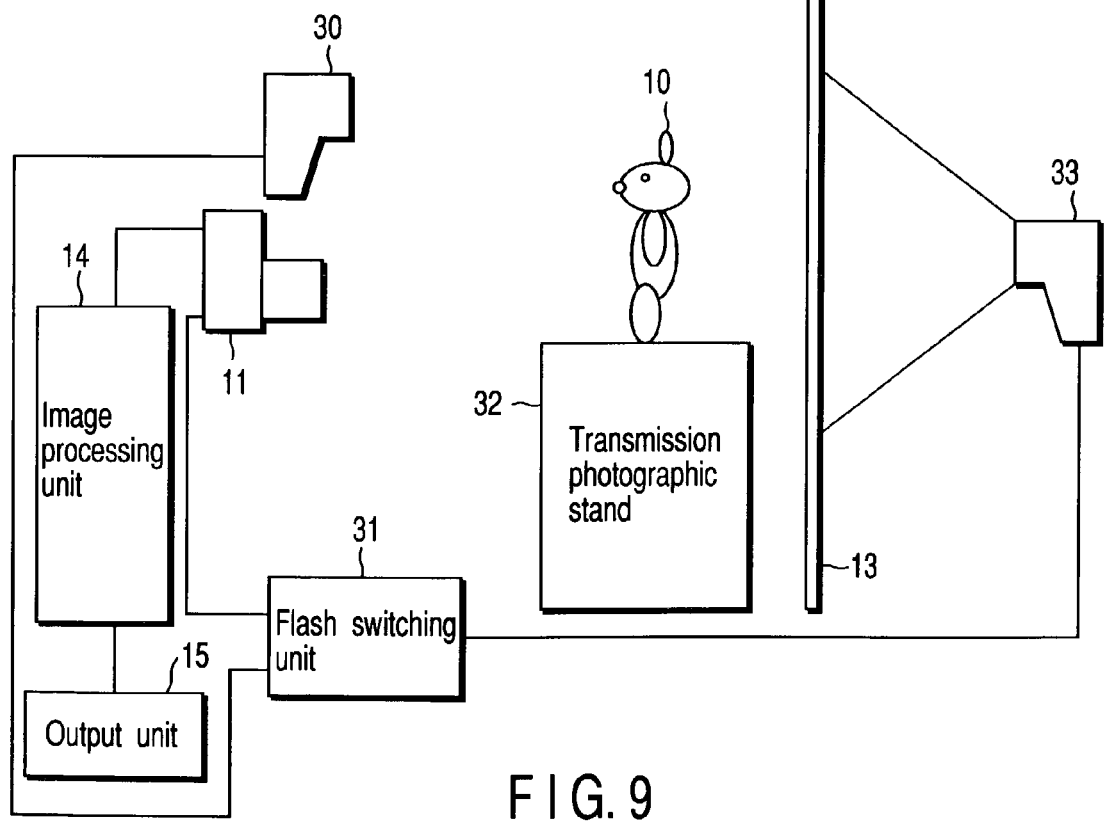
FIG. 9 shows a case where a camera in the shape extraction system of the first embodiment is provided with a subject lighting flash.

FIG. 9 shows a basic configuration of a shape extraction system according to a third embodiment of the present invention.

The third embodiment has the same configuration as that of FIG. 8 except that the camera 11 is provided with a subject lighting flash 30.

Specifically, in the third embodiment, use of the subject lighting flash 30 assures brightness for an image photographed from the front, which enables the subject to be photographed more clearly.

Figure 10:
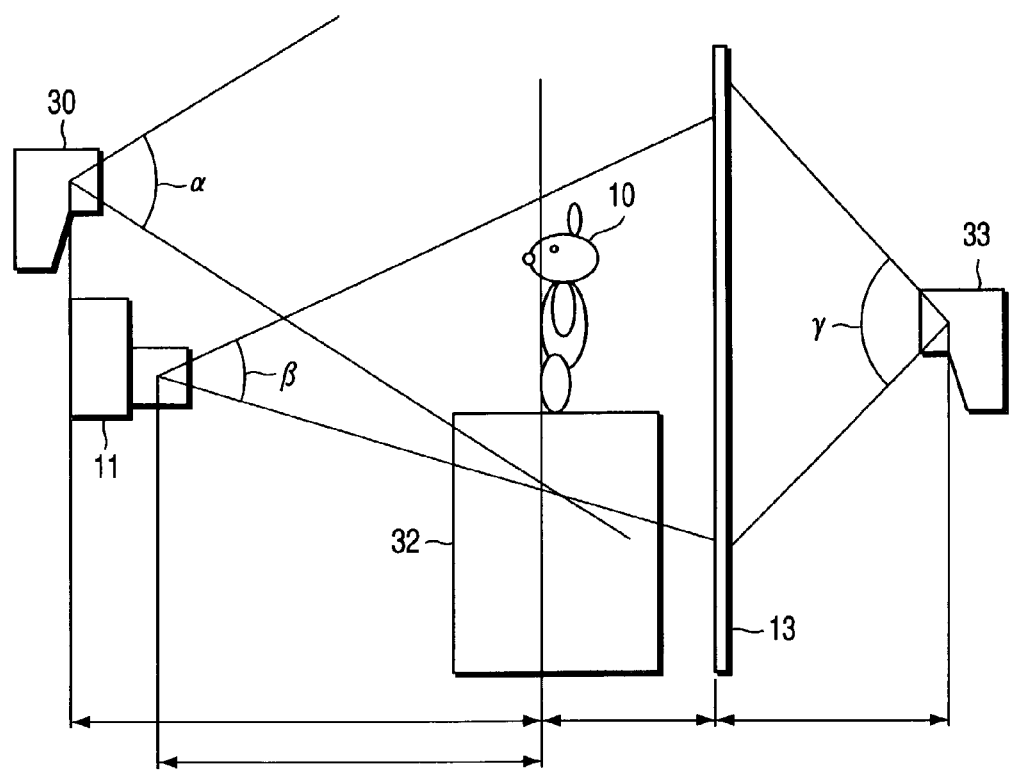
FIG. 10 is a drawing to help explain a field angle in a case where the camera in the shape extraction system of the first embodiment is provided with the subject lighting flash.

FIG. 10 is a drawing to help explain a field angle when the subject lighting flash 30 is provided.

As shown in FIG. 10, it is desirable that the field angle α of the subject lighting flash 30 should be such that all of the object 10 fits in the angle.

It is desirable that the field angle β of the camera 11 should be such that all of the object 10 fits in the angle.

Furthermore, it is desirable that the field angle γ of the background lighting flash 33 should be such that all of the back of the object 10 fits in the angle, with lighting applied from behind the object 10.

The third embodiment can also carry out the same processes as those in the first embodiment.

FOURTH EMBODIMENT

Figure 11:
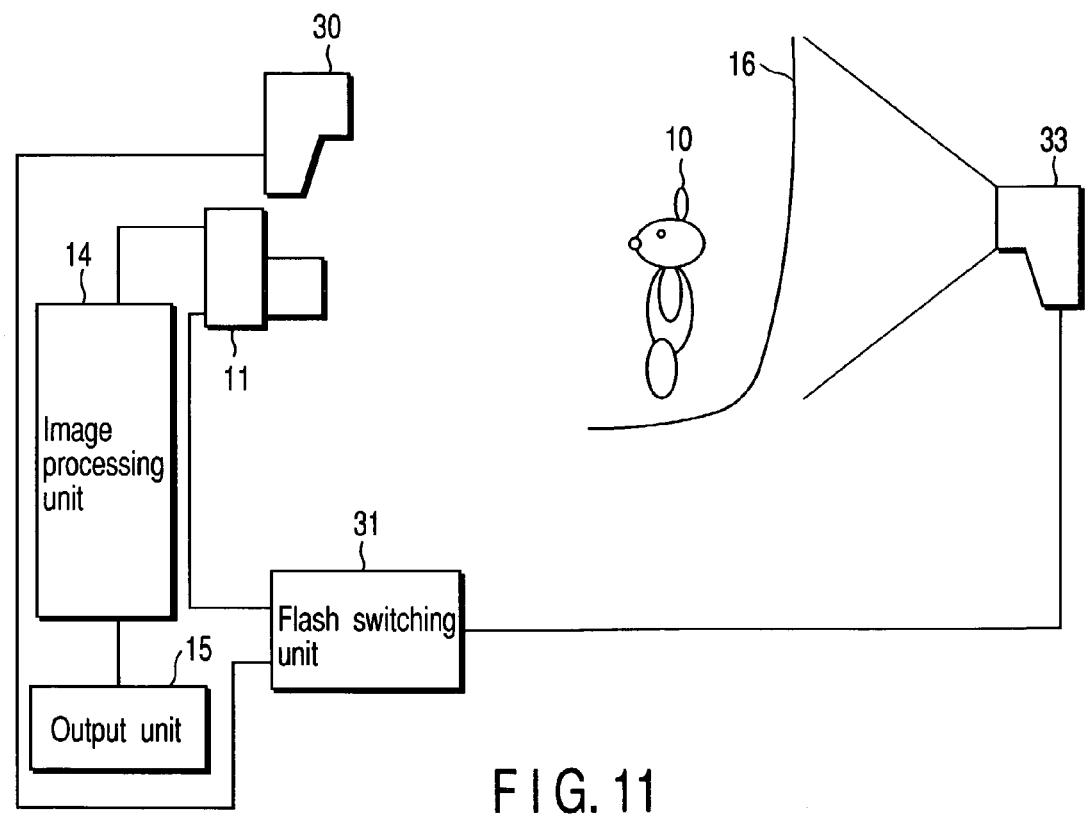
FIG. 11 shows a basic configuration of a shape extraction system according to a second embodiment of the present invention.

FIG. 11 shows a basic configuration of a shape extraction system according to a fourth embodiment of the present invention.

The fourth embodiment has the same configuration as that of FIG. 9 except that a stand for supporting the object 10 is integrated with a background screen 16.

The fourth embodiment can also carry out the same processes as those in the first embodiment.

FIFTH EMBODIMENT

FIG. 12 shows a basic configuration of a shape extraction system according to a fifth embodiment of the present invention.

In the configuration of the fifth embodiment, the camera 11 of FIG. 9 is provided with two subject lighting flashes.

Specifically, in the fifth embodiment, a subject lighting flash 30-1 and a surface light-emitting light source 13-1 are additionally provided above the object 10 as shown in FIG. 12, which enables the subject to be photographed from the front according to various scenes.

The number of subject lighting flashes may be three or more.

The fifth embodiment can also carry out the same processes as those in the first embodiment.

SIXTH EMBODIMENT

FIG. 13 shows a basic configuration of a shape extraction system according to a sixth embodiment of the present invention.

In the configuration of the sixth embodiment, a background lighting light source 40 is provided in front of a scattering reflector 13-2 instead of the surface light-emitting light source 13 of FIG. 1.

The sixth embodiment can carry out the same processes as those in the first embodiment by causing the background lighting light source 40 to project light on the front of the scattering reflector 13-2.

SEVENTH EMBODIMENT

Figure 14:
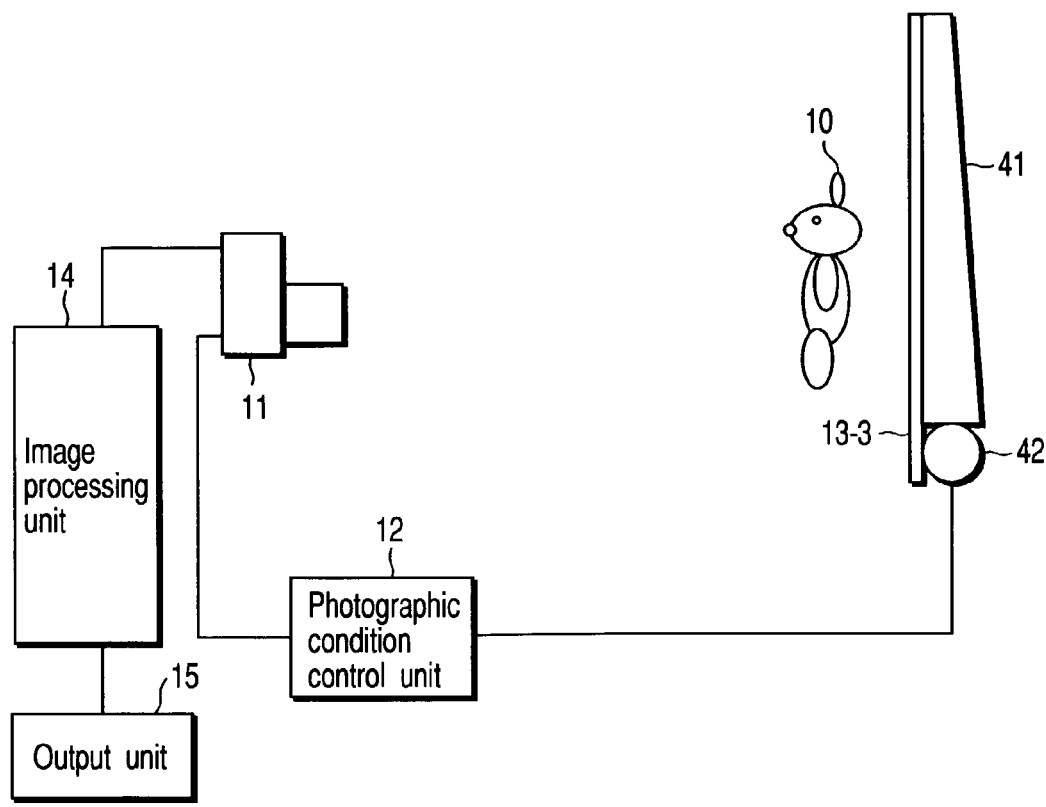
FIG. 14 shows a case where a backlight panel in the shape extraction system of the second embodiment is provided behind a scattering screen.

FIG. 14 shows a basic configuration of a shape extraction system according to a seventh embodiment of the present invention.

In the configuration of the seventh embodiment, a backlight panel 41 is provided behind a scattering screen 13-3 instead of the surface light-emitting light source 13 of FIG. 1.

A light source 42 is provided in such a manner that it is in contact with the backlight panel 41.

The seventh embodiment can carry out the same processes as those in the first embodiment by providing the backlight panel 41 behind the scattering screen 13-3.

EIGHTH EMBODIMENT

Figure 15:
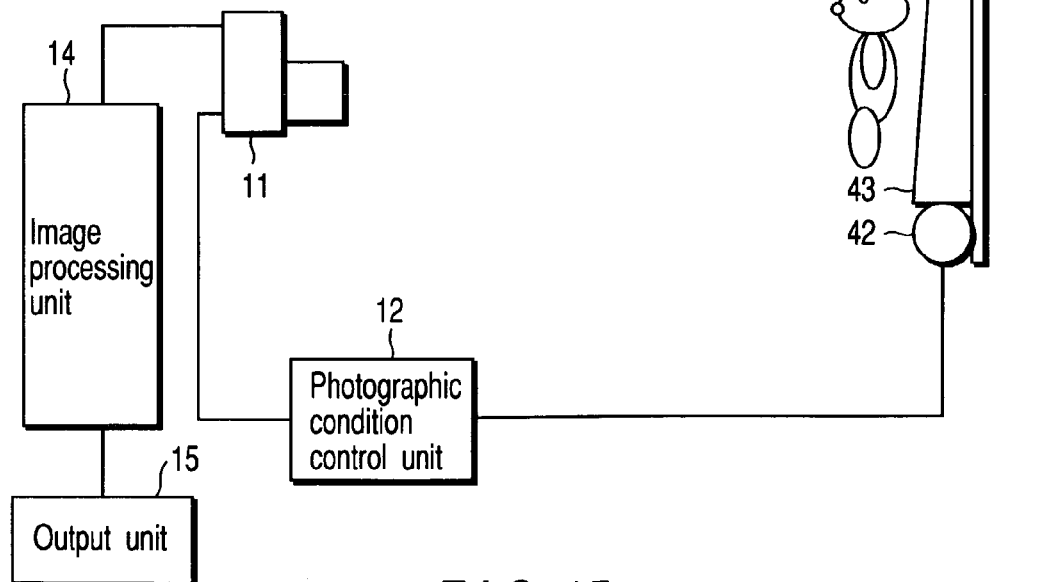
FIG. 15 shows a case where a front light panel in the shape extraction system of the second embodiment is provided in front of the scattering screen.

FIG. 15 shows a basic configuration of a shape extraction system according to an eighth embodiment of the present invention.

In the configuration of the eighth embodiment, a front light panel 43 is provided in front of the scattering screen 13-3 instead of the surface light-emitting light source 13 of FIG. 1.

The light source 42 is provided in such a manner that it is in contact with the front light panel 43.

The eighth embodiment can carry out the same processes as those in the first embodiment by providing the front light panel 43 in front of the scattering screen 13-3.

NINTH EMBODIMENT

Figure 16:
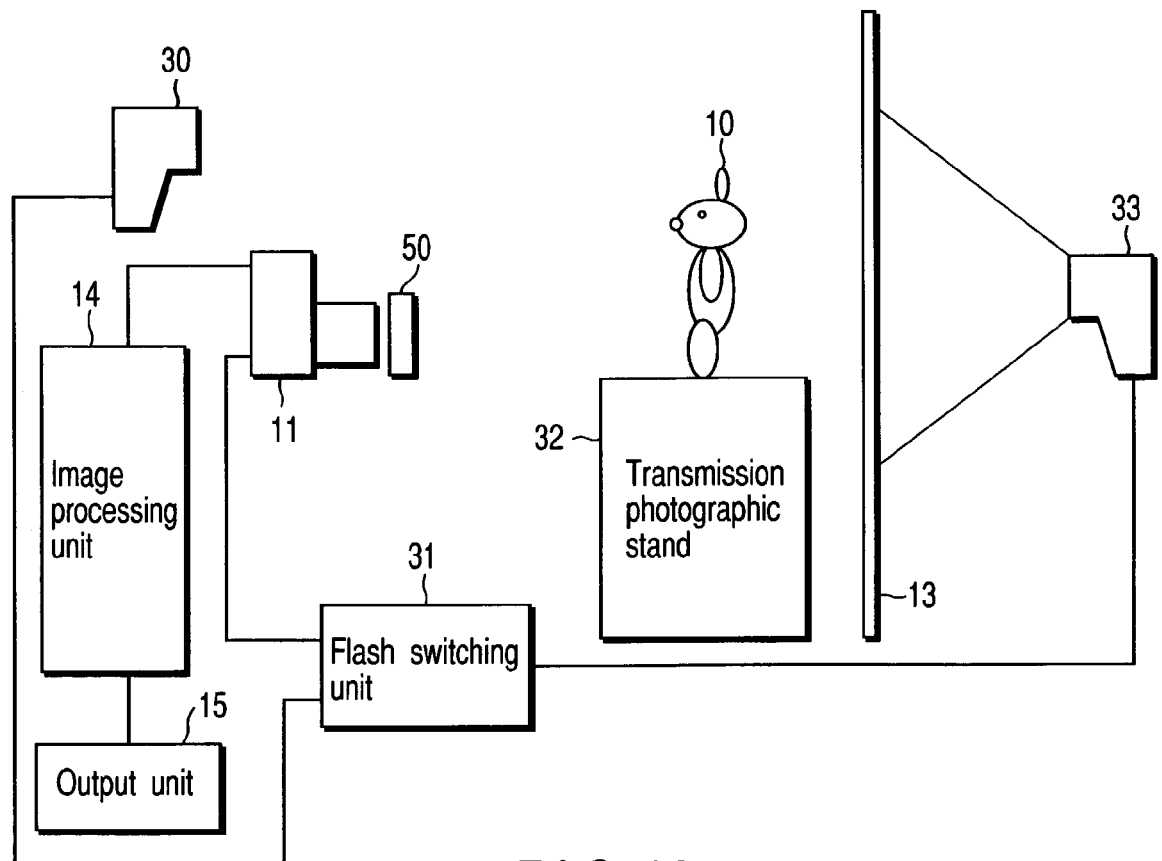
FIG. 16 shows a basic configuration of a shape extraction system according to a ninth embodiment of the present invention.

FIG. 16 shows a basic configuration of a shape extraction system according to a ninth embodiment of the present invention.

In the configuration of the ninth embodiment, a polarizing filter 50 and a transparent photographic stand 32 are used in the configuration of FIG. 9.

Specifically, in the ninth embodiment, the polarizing filter 50 is provided in front of the lens of the camera 11 as shown in FIG. 16.

The remaining configuration is the same as that of FIG. 9. That is, the subject lighting flash 30, background lighting flash 33, and transparent photographic stand 32 are arranged as in FIG. 9.

Figure 17A:
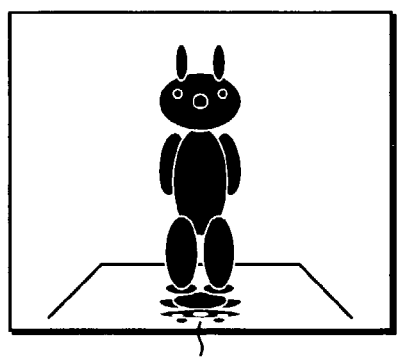
FIGS. 17A and 17B are drawings to help explain the effect of a polarizing filter applied to the shape extraction system of the ninth embodiment.
Figure 17B:
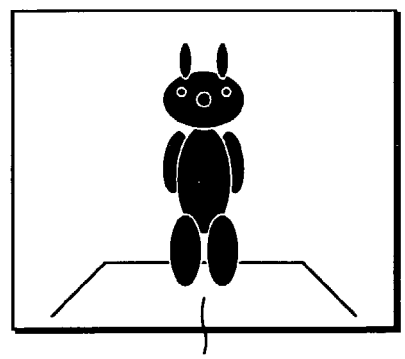

In the ninth embodiment, use of the polarizing filter 50 prevents a reflection as shown in FIG. 17B.

Specifically, when the polarizing filter 50 is not used, the reflection 51 of the photographic stand 32 appears in the photographic image as shown in FIG. 17A.

However, providing the polarizing filter 50 in front of the lens of the camera 11 enables an image 51A with no reflection to be photographed as shown in FIG. 17B.

The same effect can be produced by using an antireflection film or the like in place of or together with the polarizing filter 50.

The polarizing filter 50 may be provided in front of the surface light-emitting light source 13. In addition to this, the polarizing filter 50 may be provided in an arbitrary place.

The ninth embodiment can also carry out the same processes as those in the first embodiment.

TENTH EMBODIMENT

Figure 18:
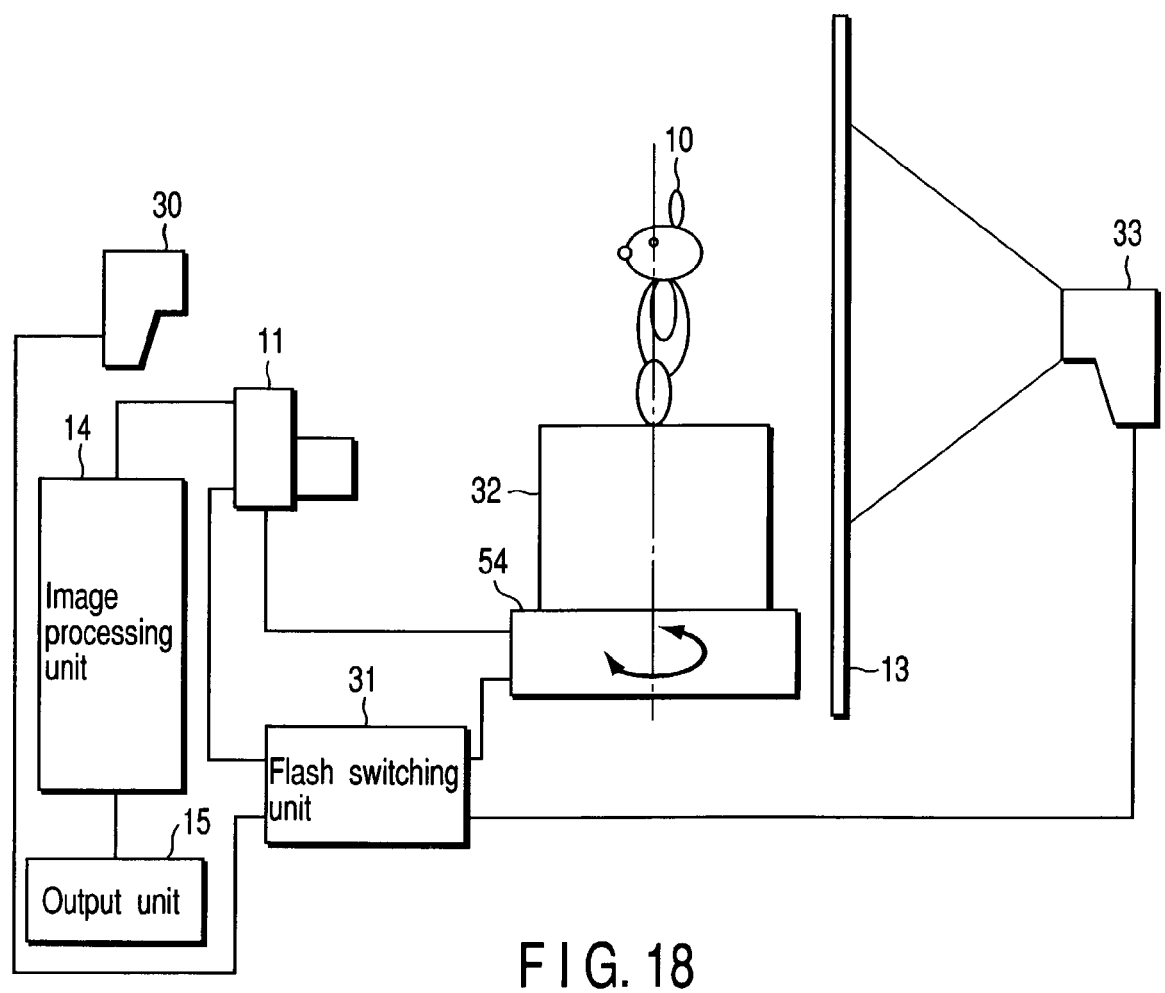
FIG. 18 shows a basic configuration of a shape extraction system according to a tenth embodiment of the present invention.

FIG. 18 shows a basic configuration of a shape extraction system according to a tenth embodiment of the present invention.

In the configuration of the tenth embodiment, a photographic stand rotating unit 54 is provided under the transparent photographic stand 32 in the configuration of FIG. 9.

Specifically, in the tenth embodiment, use of the photographic stand rotating unit 54 enables photographing to be done, while rotating the object 10. This makes it possible to photograph the object 10 from a plurality of viewpoints with different angles.

The tenth embodiment can also carry out the same processes as those in the first embodiment.

Use of a plurality of images enables the object 10 to be represented three-dimensionally as explained later in an embodiment related to a 3-D information acquisition system.

Figure 19:
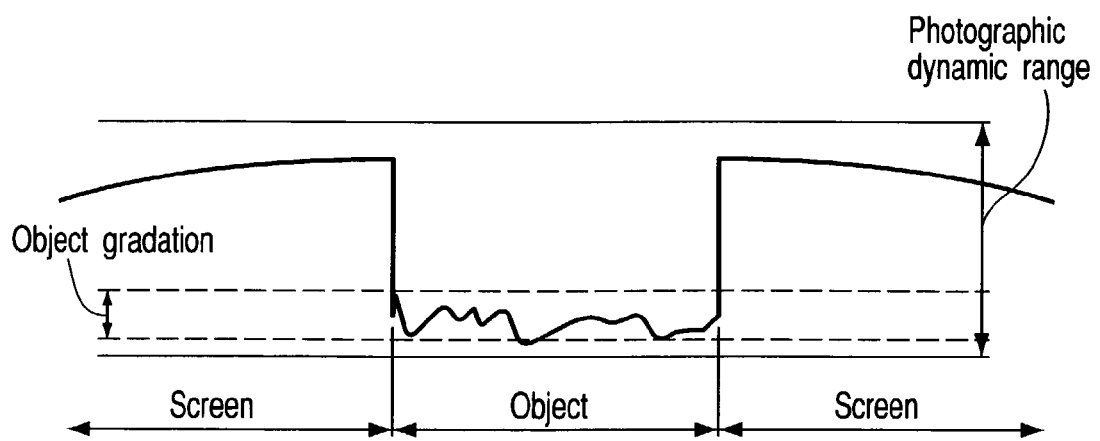
FIG. 19 is a diagram to help explain a photographic image profile in the shape extraction system of the present invention.

FIG. 19 is a diagram to help explain a photographic image profile.

Specifically, object gradation is represented in the curve of the screen as shown in FIG. 19. With the background lighting light explained in the above embodiments, the difference between the object gradation and the screen background is recognized clearly.

ELEVENTH EMBODIMENT

Figure 20:
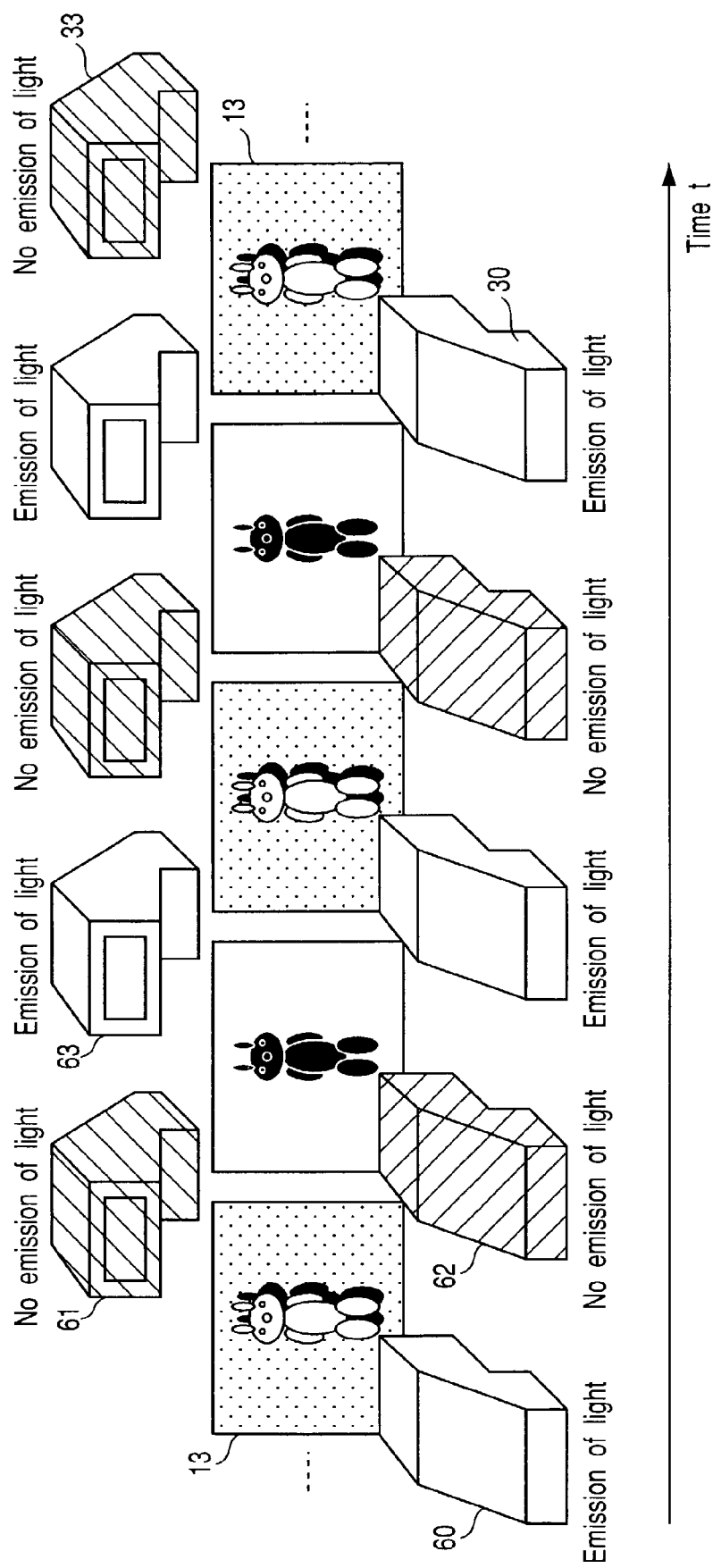
FIG. 20 shows a basic configuration of a shape extraction system according to an eleventh embodiment of the present invention.

FIG. 20 shows a basic configuration of a shape extraction system according to an eleventh embodiment of the present invention.

In the eleventh embodiment, moving pictures are photographed.

Specifically, in the eleventh embodiment, two types of images, normal images of object illuminated from its front side and silhouette images of the object illuminated from its back side, are photographed alternately as shown in FIG. 20.

First, using a flash 60, a normal image is taken with the camera 11. At this time, a flash 61 does not emit light.

Next, using a flash 63, a silhouette image is taken with the camera 11. At this time, a flash 62 does not emit light.

At this stage, one image is synthesized.

From this time on, the above processes are repeated sequentially, which enables to cutout the moving object in moving picture to be taken.

The transparent photographic stand used in the shape extraction system in each of the above embodiments may be made of, for example, Kuraray methacrylate resin "Paraglass" (registered trademark).

In addition, transparent photographic stand used in the shape extraction system in each of the above embodiments may be made of, for example, colorless, clear acrylic resin material used for water tanks or windbreaks, such tempered glass as Asahi Glass "Tempelite" (registered trademark), or such a highly transmitting optical glass as is used for prisms and lenses (ex. provided by Ohara).

As for the background screen to be photographed, serving as scattering means, for example, a white mat, such as an OS Kogyo white mat for projection, or a diffusion screen using white emboss processing and pearl processing are suitable for durable reflection scattering means.

The background screen to be photographed, which is scattering means, may be a white screen subjected to mat processing or be made of an inexpensive material, such as white Japanese vellum.

Transmission scattering means may be, for example, an OS Kogyo durable single element flannel wrench screen which incorporates minute flannel lenses and microscopic lenses into an acrylic resin plate, or a cinecoat screen formed by coating an acrylic resin material with diffusing particles.

Furthermore, as relatively inexpensive means, the background screen to be photographed, scattering means, may be a flexible rear screen formed by tempering vinyl chloride resin with diffusing particles and shaping the resulting resin.

In addition, tracing paper or thin quality paper, which is less durable but disposable, may be used as the background screen to be photographed.

As described above, according to the shape extraction systems in the first to eleventh embodiments, a silhouette image representing an exact shape of the object can be obtained without being affected by such conditions as the temperature of the object and the object's surface characteristic. Therefore, it is possible to cut out an image of the object reliably and extract the shape of the object to be photographed, without a special light source or a special photographing unit, regardless of the temperature of the object and the ambient temperature.

Furthermore, according to the shape extraction systems in the first to eleventh embodiments, since the light source used for background lighting is inexpensive, neither a special band-pass filter nor a special photographing unit is needed, and the light source for photographing a subject can be shared, and the flexibility in the photographing site is high.

An embodiment of a 3-D information acquisition apparatus will be explained which uses the shape extraction system in each of the first to eleventh embodiments as component techniques.

Although explanation will be given mainly in a case where an object is moved, the same holds true when the photographing means is moved.

TWELFTH EMBODIMENT

Figure 21:
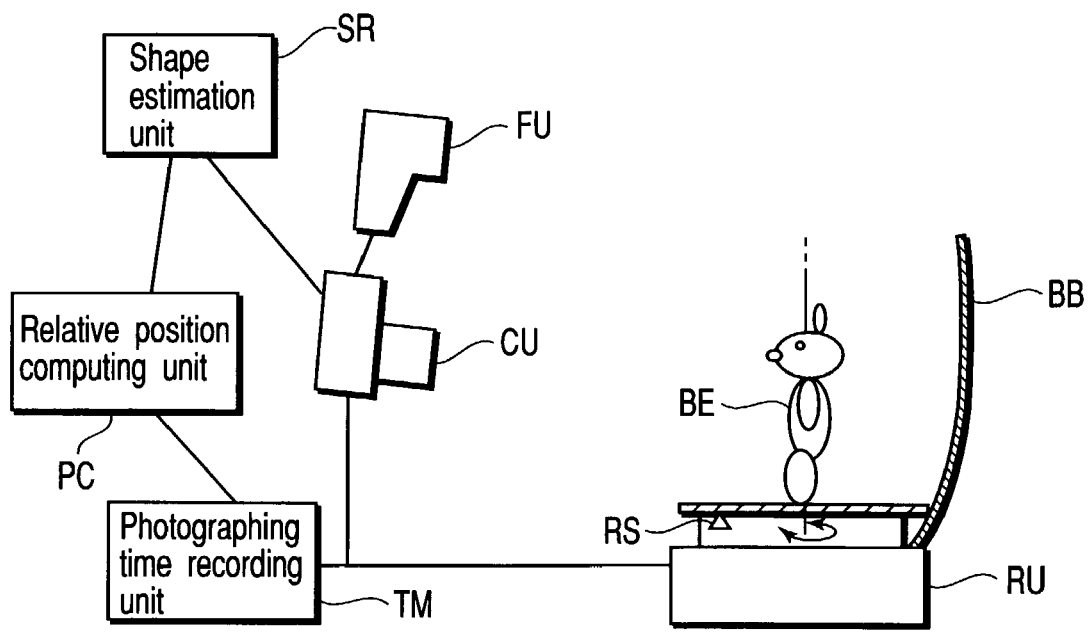
FIG. 21 is a block diagram showing the configuration of a 3-D information acquisition system according to a twelfth embodiment of the present invention.

FIG. 21 is a block diagram showing the configuration of a 3-D information acquisition apparatus according to a twelfth embodiment of the present invention.

As shown in FIG. 21, the twelfth embodiment comprises a camera CU as photographing means, a flash FU for lighting a subject, a turntable (or a photographic stand rotating unit) RU as relative position moving means RU, a sensor RU that recognizes that the turntable makes one turn, a blue back BB as a background plate, an object BE, a photographing time recording unit TM, a relative position computing unit PC as relative position determining means, and a shape estimating unit SR that estimates a shape.

Figure 22:
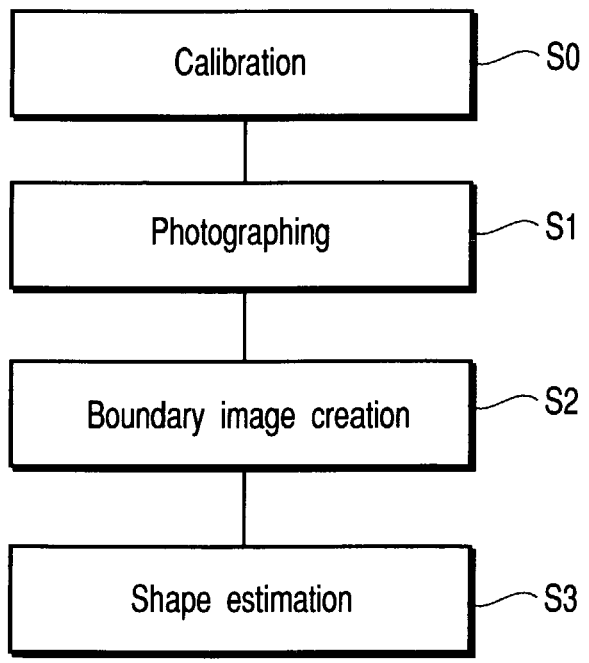
FIG. 22 is a flowchart showing a general processing flow in the 3-D information acquisition system of the twelfth embodiment.

FIG. 22 is a flowchart for general processing in the twelfth embodiment.

As shown in FIG. 22, the flow of general processing in the twelfth embodiment comprises step S0 of making calibration, step S1 of photographing, step S2 of creating a boundary image, and step S3 of estimating the shape.

Step S0 of making calibration has only to be carried out only once unless the focus position and zoom position of the camera CU and the positional relationship between the camera CU and the turntable RU remain unchanged.

(Step S0)

In step S0, calibration is made.

Calibration in the twelfth embodiment means the process of determining the internal parameters of the camera CU and the positional relationship between the camera CU and the turntable RU to find on which point of the photographed image a point in a three-dimensional space is projected.

First, the internal parameters of the camera CU will be explained.

The internal parameters of the camera CU are the vertical enlargement ratio $\alpha_U$ of the photographed image, the horizontal enlargement ratio $\alpha_V$, and the optical center (a perpendicular line drawn from the position of the main point to the surface of the image as shown in FIG. 3) $u_0$, $v_0$.

Figure 23:
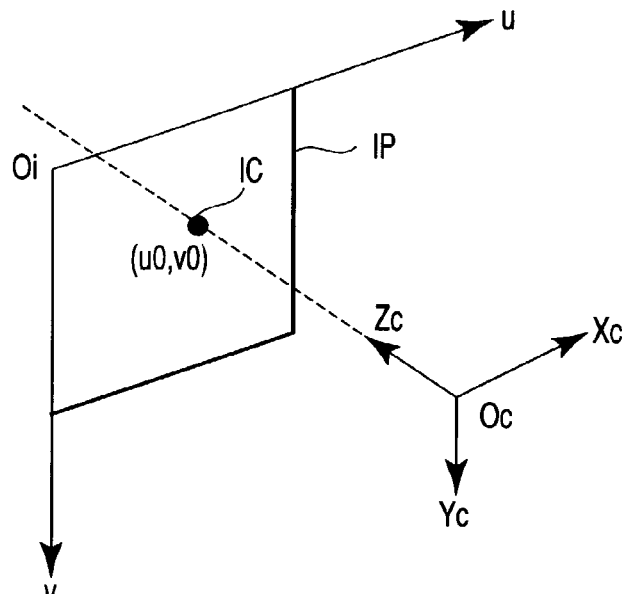
FIG. 23 shows the relationship between a camera coordinate system and an image coordinate system applied to the 3-D information acquisition system of the twelfth embodiment.

The enlargement ratio is the ratio of the width of a pixel on the vertical and horizontal image to the distance between the optical main point of the camera CU and the image surface., FIG. 23 shows the relationship between the camera coordinate system and the image coordinate system.

For example, in the image coordinate system Oi, the origin Oi is set at the top left of the image surface IP, the u-axis is set in the horizontal direction, and the v-axis is set in the vertical direction. In the camera coordinate system Oc, the origin Oc is set in the position of the main point of the camera CU, the X-axis is set in parallel with the u-axis, the Y-axis is set in parallel with the v-axis, and the Z-axis is set in the direction of the image surface.

When a certain point is expressed by $W=(x, y, z)\char`^T$ on the camera coordinate system Oc and by $I=(u, v)\char`^T$ on the image coordinate system Oi, the relationship between these two coordinate systems Oc, Oi is as follows:

$$I'=(u',v',w')\char`^T=U\times W'$$

$$I=(u'/w',v'/w')\char`^T$$

$$W'=(x,y,z,1)\char`^T$$

where $\char`^T$ represents the transposition of a vector and U represents a transformation matrix from the camera coordinate system Oc to the image coordinate system Oi.

Using the perspective ratio $\alpha_U$ in the u direction, the perspective ratio $\alpha_V$ in the v direction, and the optical center $u_0$, $v_0$, U is expressed by:

$$U = \begin{pmatrix} \alpha_u & 0 & u_0 & 0 \\ 0 & \alpha_v & v_0 & 0 \\ 0 & 0 & 1 & 0 \end{pmatrix}$$

A method of determining these parameters has been disclosed in the reference "Three-dimensional CG made from pictures" by Tuyoshi Jyo, Kindai Kagakusha, 2001.

Next, the positional relationship between the camera CU and the turntable RU will be explained.

This is equivalent to the relationship between the camera coordinate system Oc and the turntable coordinate system Or set on the turntable RU.

Figure 24A:
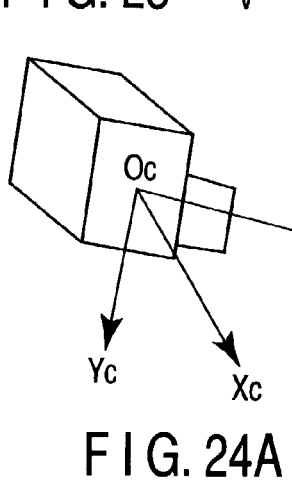
FIGS. 24A and 24B show the relationship between a camera coordinate system Oc and a turntable coordinate system Or set on a turntable RU in the 3-D information acquisition system of the twelfth embodiment.
Figure 24B:
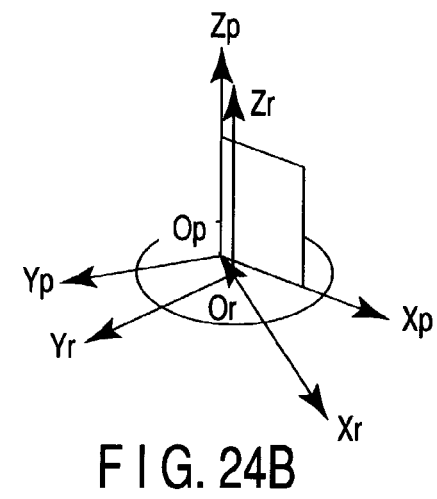

FIG. 24 shows the relationship between the camera coordinate system Oc and each coordinate system on the turntable coordinate system Or.

In the turntable coordinate Or, the axis of rotation is set in the Z direction and the rotating plate is set in the XY plane.

When a certain point is expressed by $W=(x, y, z)^T$ on the camera coordinate system Oc and by $Z=(p, q, r)^T$ on the turntable coordinate system Or, the relationship between these two coordinate systems Oc, Or is as follows:

$$W = M \times Z'$$

$$W' = (x, y, z, 1)^T$$

$$Z' = (p, q, r, 1)^T$$

Here, using a rotation matrix Rcr expressing the positional relationship of the turntable coordinate system Or viewed from the camera coordinate system Oc and a translation vector Tcr, M is expressed by:

$$M = \begin{pmatrix} & & | & \\ & Rcr & | & Tcr \\ & & | & \\ 0 & 0 & 0 & 1 \end{pmatrix}$$

Figure 25:
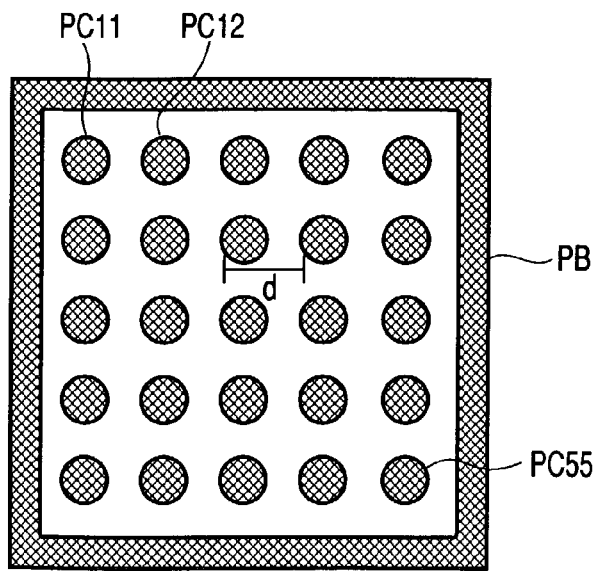
FIG. 25 shows a pattern flat plate used as an example of determining a rotation matrix Rcr and a translation vector Tcr applied to the 3-D information acquisition system of the twelfth embodiment.
Figure 26:
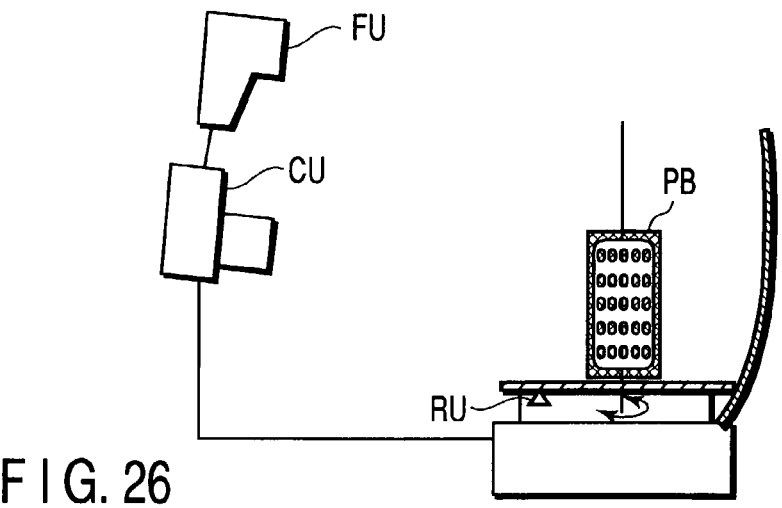
FIG. 26 is a drawing to help explain a method of photographing with a camera from a plurality of different angles obtained by standing the pattern flat plate of FIG. 25 straight on the turntable and rotating the turntable in steps of 10 degrees, as an example of determining a rotation matrix Rcr and a translation vector Tcr applied to the 3-D information acquisition system of the twelfth embodiment.

A method of determining a rotation matrix Rcr and a translation vector Tcr is, for example, to stand a pattern plate PB straight on the rotating plate of the turntable RU as shown in FIG. 26 and photographing the plate with the camera CU from a plurality of different angles, rotating in steps of 10 degrees. In the pattern plate PB, pattern PCs are arranged at intervals of d as shown in FIG. 25.

For example, if the plate PB is photographed at five different angles, coordinates PC111, PC112 ... PC115, PC211, PC212, ..., PC215, PC311, PC312, ..., PC315, PC411, PC412, ..., PC415, PC511, PC512, ..., PC515 on each image coordinate system Oi of the center of gravity of all the patterns PC11, PC12 ... PC15, PC21, PC22, ..., PC25, PC31, PC32, ..., PC35, PC41, PC42, ... PC45, PC51, PC52, ..., PC55 in the photographed images IPB1, IPB2, ..., IPB5 are determined.

Consider a pattern plate coordinate system Op where the Z direction is set in the vertical direction of the pattern plate, the Y direction is set in the horizontal direction, the X direction is set in the normal direction of the plate, and the origin is set at the bottom left of the plate. In this case, coordinates PC11, PC12, ..., PC15, PC21, PC22, ..., PC25, PC31, PC32, ..., PC35, PC41, PC42, ..., PC45, PC51, PC52, ..., PC55 on the pattern plate coordinate system Op of each pattern is expressed by:

$$PCnm = (0, m \times d, n \times d)^T$$

Here, if a transformation matrix from the pattern plate coordinate system Op to the turntable coordinate system Or is G and the vector after the transformation is PCRpnm, this gives:

$$PCRpnm = (PCRpnmx, PCRpnmy, PCRpnmz)^T$$

$$PCRpnm' = (PCRpnmx, PCRpnmy, PCRpnmz, 1)^T$$

$$= Rp \times G \times PCnm'$$

$$PCnm' = (0, m \times d, n \times d, 1)^T$$

$$G = \begin{pmatrix} \cos\alpha & -\sin\alpha & 0 & t_{rpx} \\ \sin\alpha & \cos\alpha & 0 & t_{rpy} \\ 0 & 0 & 0 & 0 \\ 0 & 0 & 0 & 1 \end{pmatrix}$$

$$Rp' = \begin{pmatrix} & & | & 0 \\ & Rp & | & 0 \\ & & | & 0 \\ 0 & 0 & 0 & 1 \end{pmatrix}$$

where subscript p represents one of the plurality of images and Rp is a known matrix representing the rotation of the turntable RU.

That is, solving the simultaneous equations $Ppnm' = U \times M \times Rp \times G \times PCnm'$ gives the relationship between the camera coordinate system Oc and the turntable coordinate system Or, that is, the matrix M.

If the coordinate of point F in a certain three-dimensional space viewed from the turntable coordinate system Or is Fr and the coordinate of point F viewed from the image coordinate system Oi is Fi, use of M gives:

$$Fi' = (u', v', w')^T = U \times M \times Fr'$$

$$Fi = (u'/w', v'/w')^T$$

$$Fr' = (Fr^T, 1)^T$$

This makes it possible to know on which point an arbitrary point in the three-dimensional space is projected.

Instead of the pattern flat plate, any three-dimensional shape, such as a cylinder or a quadratic prism may be used, provided that a characteristic pattern is put on the solid surface of the cylinder, prism, or another special shape and the three-dimensional coordinates of the center of gravity of the pattern is determined exactly.

(Step S1)

Next, in step S1, an object BE is placed on the turntable RU. While being rotated, the object BE, together with the background BB, is photographed with the camera CU, which produces object images A1, A2, ..., An.

Figure 27:
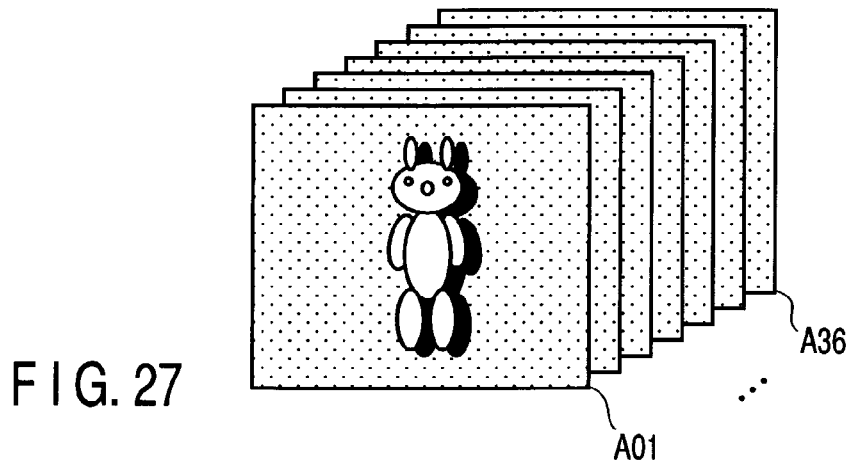
FIG. 27 shows object images A01, A02, . . . , A36 applied to the 3-D information acquisition system of the twelfth embodiment.

For example, as the object BE is rotated at a rotational speed of 1 rpm, it is photographed 36 times at almost regular intervals during one turn (that is, it is photographed at intervals of 60/36=about 1.67 seconds). As a result, a plurality of object images A01, A02, ..., A36 are obtained as shown in FIG. 27.

At this time, the subject lighting flash FU may be operated in synchronization with the photographing.

In this case, if photographing is done at a shutter speed of 1/500, the object BE is rotated through only 0.012 degrees (=360÷60÷500), with the result that the image is less liable to move slightly.

When photographing is effected using a flash, the photographing time becomes shorter by several microseconds to several milliseconds, there is almost no problem.

The number of revolutions has only to be large enough to allow the object BE to rotate stably and prevent the image from moving slightly.

Here, times T1, T2, ..., T36(s) at which object images A01, A02, ..., A36 were photographed are recorded by the photographing time recording unit TM.

Times T1, T2, ..., T36 may be, for example, attached to images or paired with the photographing sequence and stored as a table in another file.

The turntable RU is provided with a sensor RS so as to recognize the rotation of the table RU.

This makes it possible to measure the time required for the turntable RU to make one turn. Calculating the average angular speed of one turn decreases the effect of fluctuations in the angular speed of the turntable RU on the three-dimensional configuration.

As for the background, for example, a blue back background BB is used as shown in FIG. 21.

Anything may be used as the background, provided that it is recognized as the background. For example, red, yellow, or green may be used instead of blue. A pattern, such as a checked pattern, may also used.

(Step S2)

In step S2, the shape estimating unit SR of FIG. 21 creates boundary images from object images A01, A02, ..., A36.

Figure 28:
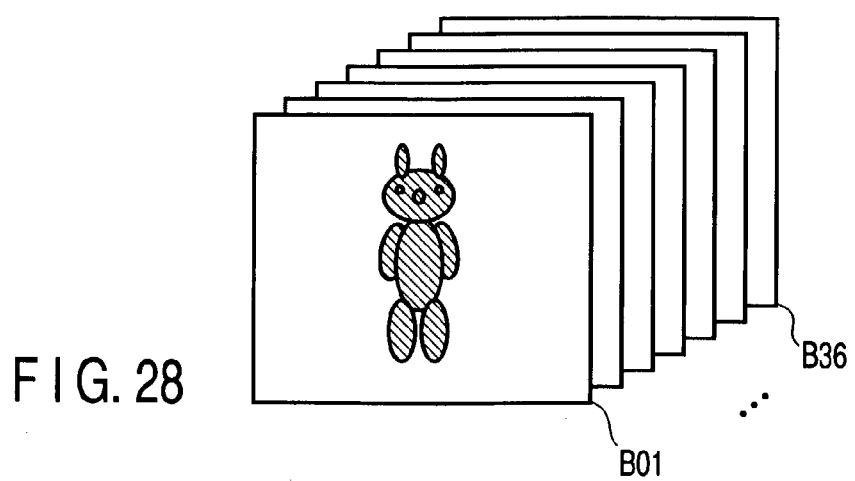
FIG. 28 shows boundary images B01, B02, . . . , B36 applied to the 3-D information acquisition system of the twelfth embodiment.

That is, the background BB is recognized from the object images A01, A02, ..., A36 and a plurality of boundary images B01, B02, ..., B36 are created as shown in FIG. 28.

These are binary images, with an area with an object being "1" and an area with no object being "0."

An area where it is impossible to make a distinction between the object and the background may be stored using a number other than "0" and "1."

Since the number of object images A01, A02, ..., A36 is 36, the number of boundary images is 36.

(Step S3)

Next, in step S3, the shape estimating unit SR of FIG. 21 estimates the shape.

Figure 29:
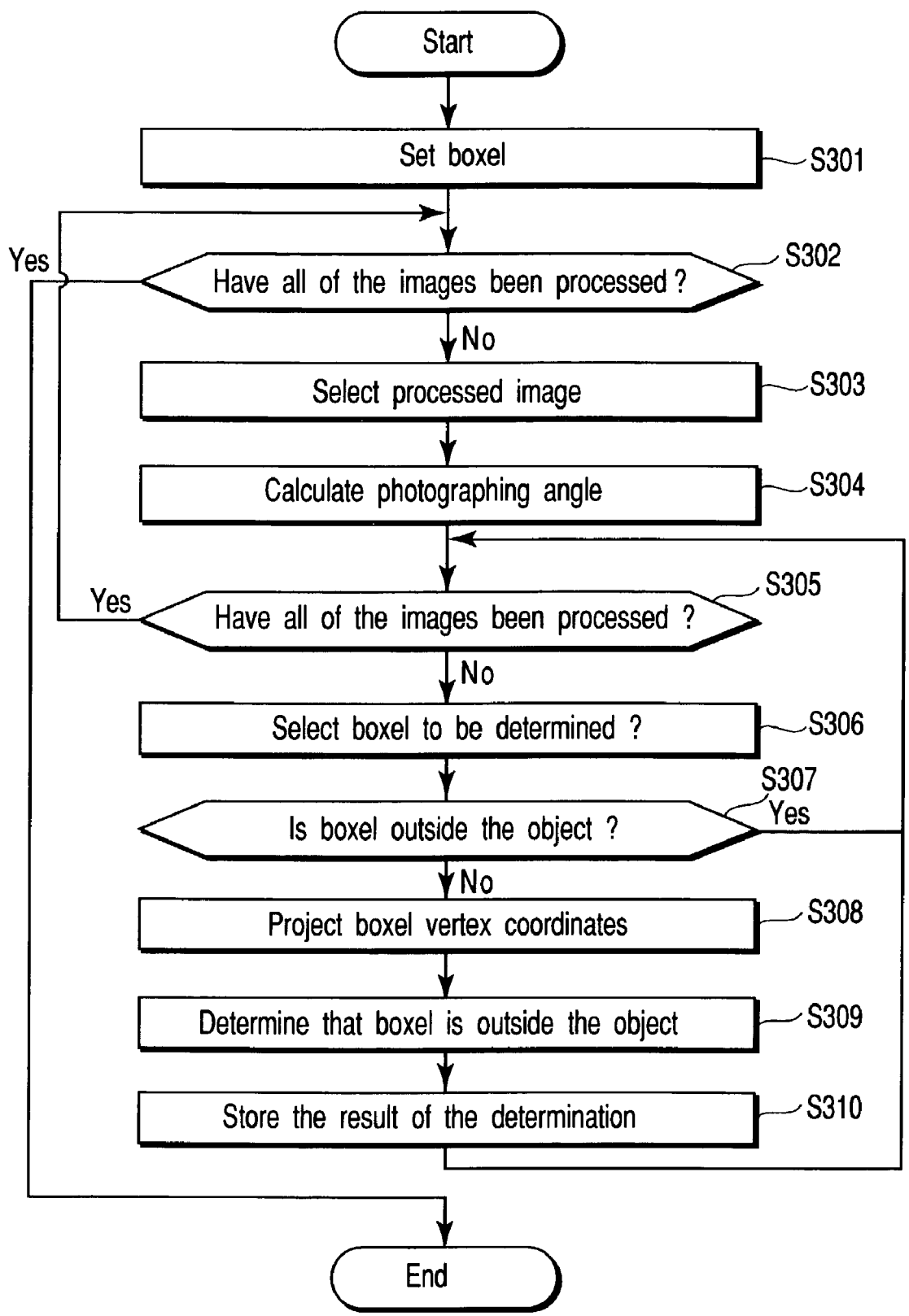
FIG. 29 is a flowchart to help explain the flow of the process in step S3 of FIG. 22.

FIG. 29 is a flowchart for the process in step S3.

First, in step S301 of boxel setting, a boxel BOX is set on the turntable coordinate system Or as shown in FIG. 30.

In this case, the setting range of boxel BOX is set in an area that covers the object completely.

The size of a cell BS and the number of cells BS are set according to the desired accuracy.

For instance, if the setting range is a cube with a diagonal of (−1, −1, 0), (1, 1, 2), the size of one cell is 0.001 and the number of cells BS is 2000×2000×2000=8×10^9 where ^9 means the ninth power.

In the setting range, a sphere with a diameter of 2 put almost in the center of the turntable RU can be measured.

While in the twelfth embodiment, the cells BS and the setting range of boxel are cubic, they may be, for example, rectangular parallelepiped, a triangular prism, or a hexagonal prism. In a cylindrical coordinate system, fan-shaped cells and a fan-shaped boxel may be used.

When the object is flat, the amount of calculations and the memory capacity can be decreased remarkably by making the boxel setting range rectangular parallelepiped.

Next, it is determined in step S302 whether all of the images have been processed. If not, one of the unprocessed images is selected in step S303 of processing image selection.

Then, in step S304 of photographing angle computation, photographing angles Aa1, Aa2, ..., Aa36 are determined from a reference angle.

This is done in the relative position computing unit PC of FIG. 21.

In this case, the reference angle may be, for example, the angle at which photographing was done for the first time or another photographing angle.

In the twelfth embodiment, since the turntable RU is rotated at a rotational speed of 1 rpm, the turntable RU rotates six degree in a second. This gives:

$Aan = (Tn - T1) \times 6$

In step S305, it is determined whether all of the boxels have been processed. If not, a boxel to be determined is selected in step S306 of to-be-determined boxel selection.

Then, in step S307, it is determined whether a boxel is outside the object. Of the boxels not determined to be outside the object, an undetermined boxel is selected.

The selected boxel is projected onto boundary images B01, B02, ..., B36 using the transformation matrix and the rotation matrix Rp corresponding to photographing angles Aa1, Aa2, ..., Aa36 in step S308 of boxel vertex coordinate projection. Then, in step 309 of boxel outside determination, if all of the vertexes are not included in the object area, it is determined that the boxel is outside the object.

In the outside determination, the center of gravity of the boxel may be projected on boundary images B01, B02, ..., B36 and, when the projected point is not included in the object area, it may be determined that the boxel is outside the object.

The result of the determination is stored in the result-of-determination storage section.

FIG. 31 shows examples of the determination.

Specifically, FIG. 31A shows a case where it is determined that the boxel is inside the object. FIG. 31B shows a case where it is determined that the boxel is outside the object.

Figure 32:
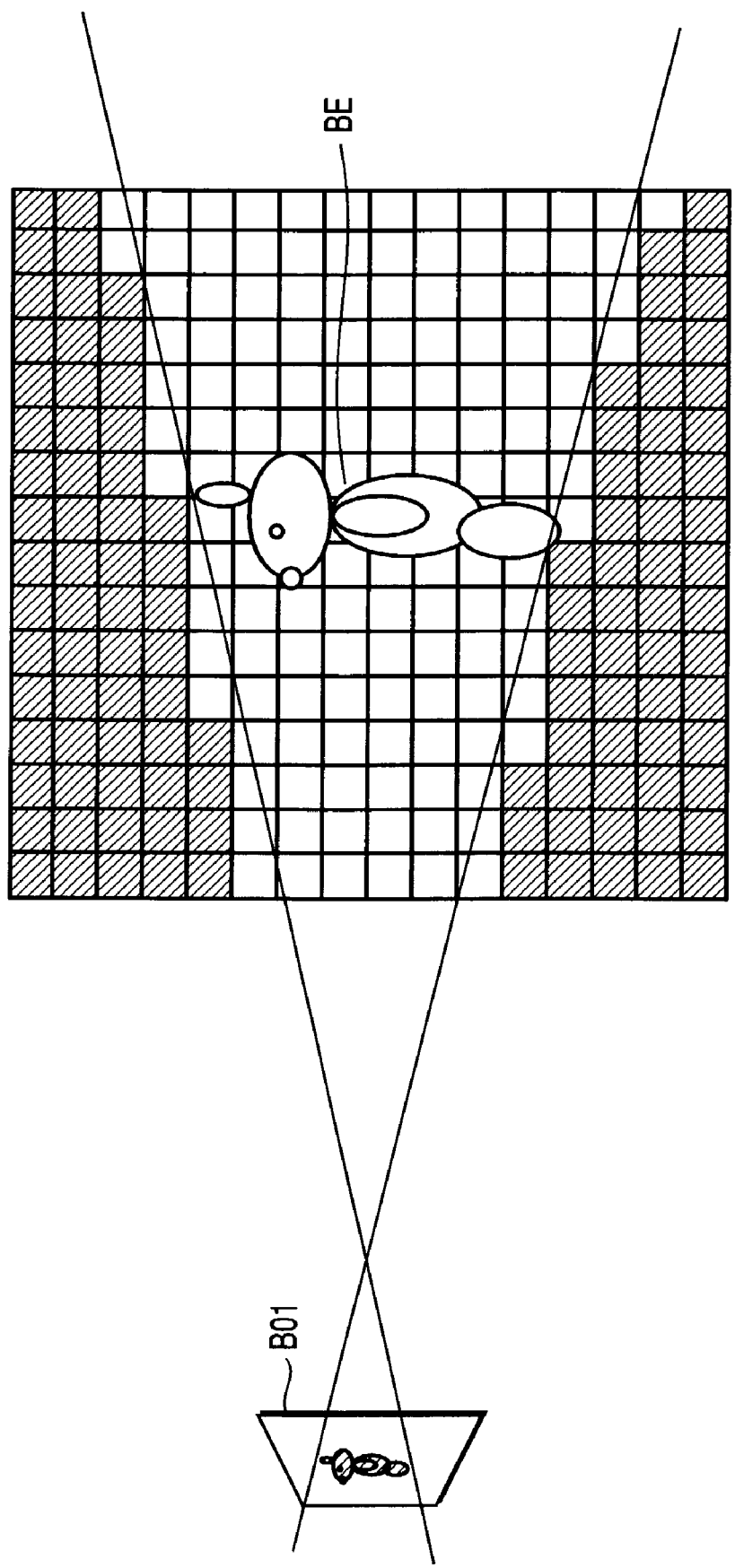
FIG. 32 is a drawing to help explain how a boxel is determined to be external with boundary image B01 applied to the 3-D information acquisition system of the twelfth embodiment.
Figures 33A, 33B:
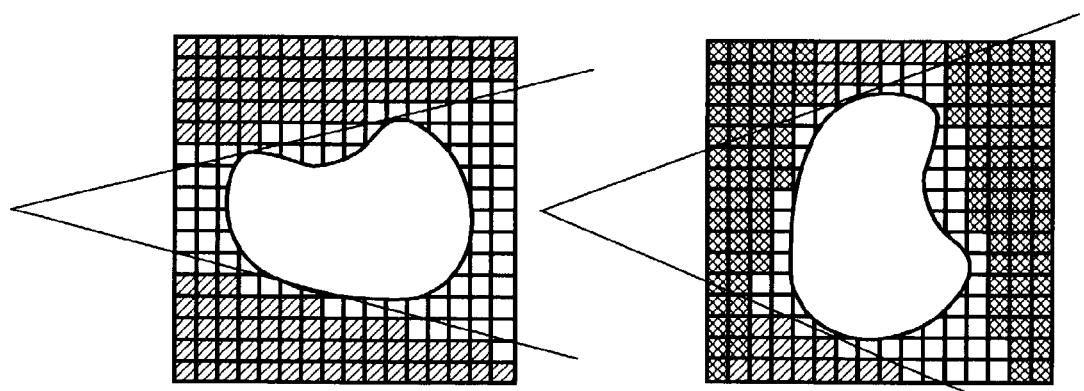
FIGS. 33A to 33D are drawings to help explain how an object applied to the 3-D information acquisition system of the twelfth embodiment is cut out, using a two-dimensional simple shape.
Figures 33C, 33D:
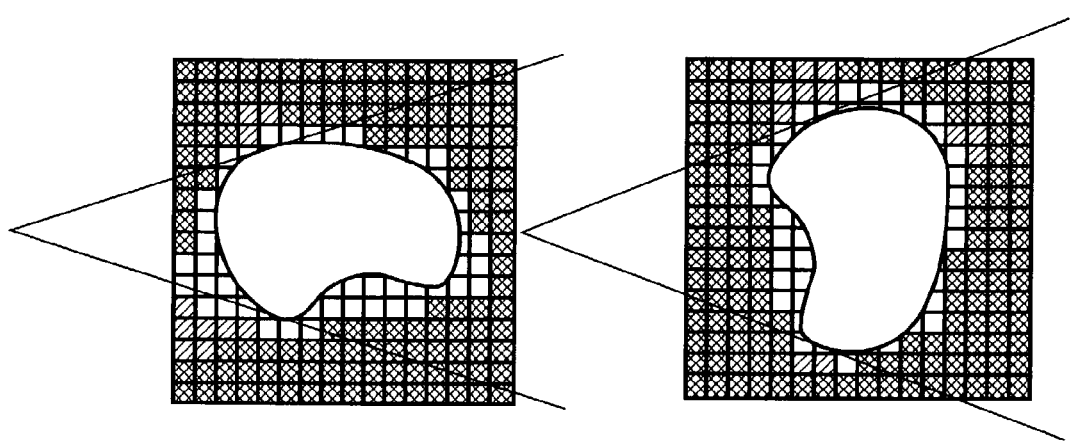

FIG. 32 shows how boxels are determined to be outside the object on the basis of boundary image B01.

In the figure, the shaded portion is the boxels determined to be outside the object.

FIGS. 33A to 33D show two-dimensional examples to help explain how the object is cut out by this method.

In the figures, the shaded portions are the cut-out boxels and the crosshatched portions are the boxels previously determined to be outside the object and therefore not to be determined this time.

A boxel determined to be outside the object the number of times larger than a threshold value at the boxel outside determining section is registered as an outside boxel.

The determination may be made using the outside probability=the number of determinations/the number of images used in the determinations.

Finally, after all of the images have been processed, the boxels not outside the object are made a 3-D shape of the object.

Photographing may be done in a plurality of turns with the photographing section.

In this case, photographing at a different viewpoint in each turn produces the following effect.

For example, when photographing is done with an increasing resolution in the direction of rotation, for example, in a first turn near 0 degree and at 180 degrees (if the photographing angle is known accurately, the angles do not necessarily take these values), in a second turn, near 90 and 270 degrees, and in a third turn, near 45, 135, 225, and 315 degrees, a detailed shape is determined gradually as the number of turns increases.

This enables the shape estimating section to find the area for shape estimation in an early stage of the process, which helps speed up the process.

Even when the photographing section photographs near 0, 10, ..., 340, 350 sequentially, making a shape estimation in the order of 0, 180, 90, 270, 40, 130, 220, 310, ... degrees produces a similar effect to that described above.

In other words, the shape estimation should be made in the following procedure.

For example, after shape estimation is made using an image from a first viewpoint, shape estimation is made using an image from a second viewpoint opposing or facing the first viewpoint.

Following this, the next shape estimation is made using an image photographed from a viewpoint which is one of the remaining viewpoints not used in the shape estimation between the first viewpoint and the second viewpoint and which interpolates the angle formed by the visual line from the first viewpoint and the visual line from the second viewpoint.

From this point on, a viewpoint corresponding to the position in which the angle formed by the visual lines from the viewpoints used in the shape estimation process is selected for the remaining images not used in the shape estimation process sandwiched between the viewpoints of the images used in the shape estimation. The images from the selected viewpoint are used for the next shape estimation.

Thereafter, repeating the above processes produces the aforementioned effect.

Figure 34:
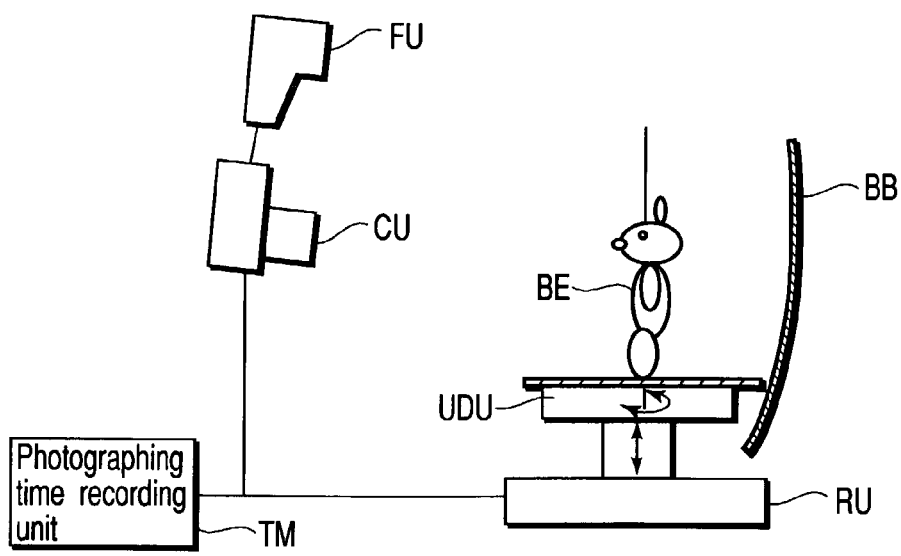
FIG. 34 is a block diagram showing the configuration of a modification of the 3-D information acquisition system according to the twelfth embodiment.

As shown in FIG. 34, a photographing table lift UDU that raises and lowers the object BE in the direction of rotation axis at a constant speed may be further provided. Then, photographing may be done, while the turntable RU is being raised at a constant speed in response to the rotation of the turntable RU.

In this case, since the relative position in the vertical direction changes, a region of the object, which could not be estimated in a simple rotational motion, can be estimated.

Although the photographing position changes in angle and height, since the photographing position is moving at a constant speed, the height can be determined by multiplying the constant speed by the photographing time as is the angle.

THIRTEENTH EMBODIMENT

The configuration of a 3-D information acquisition apparatus according to a thirteenth embodiment is the same as that of the twelfth embodiment.

Figure 35:
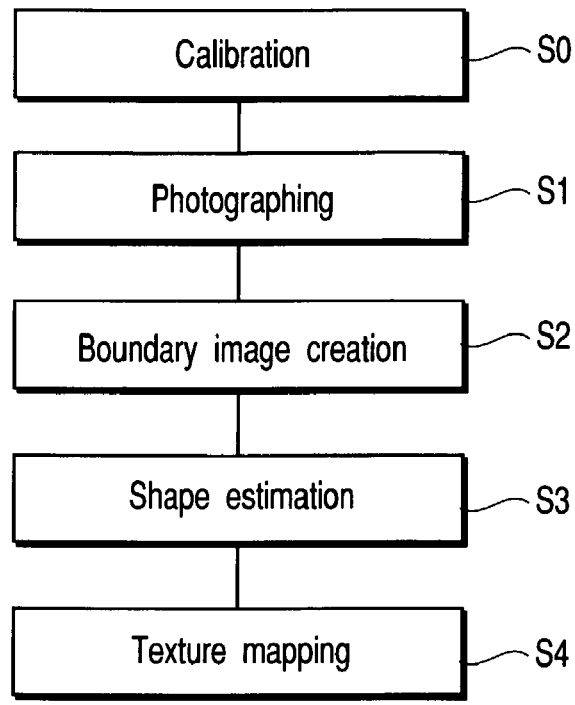
FIG. 35 is a flowchart to help explain the flow of processing in a 3-D information acquisition system according to a thirteenth embodiment of the present invention.

FIG. 35 is a flowchart for the processing of the 3-D information acquisition apparatus according to the thirteenth embodiment.

The flow of the processing of the 3-D information acquisition apparatus in the thirteenth embodiment is the same as that from step S0 to step S3 in the first embodiment.

In step S4 of texture mapping, color information about the boxels on each surface is determined using object images A01, A02, ..., A36.

For example, the coordinates of the center of a boxel at the surface are projected onto the object images A01, A02, ..., A36 from which the boxel is seen. The pieces of color information about these object images are averaged, thereby producing color information about the boxel.

This enables not only the three-dimensional shape of the object but also color information about each part to be obtained.

FOURTEENTH EMBODIMENT

Figure 36:
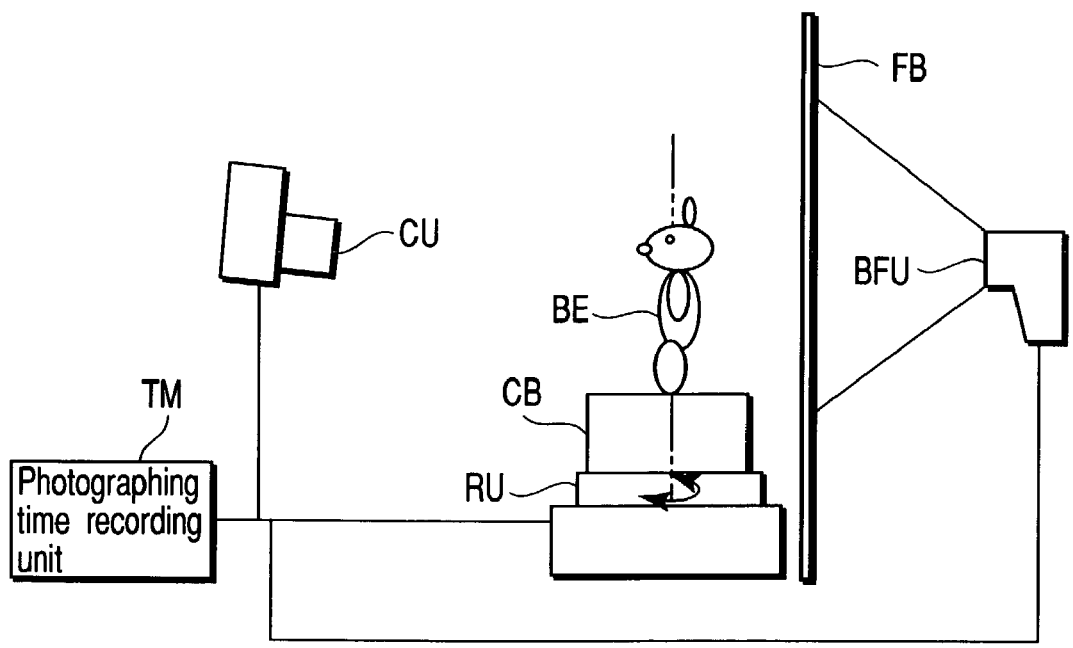
FIG. 36 is a block diagram showing the configuration of a 3-D information acquisition system according to a fourteenth embodiment of the present invention.

FIG. 36 is a block diagram showing the configuration of a 3-D information acquisition apparatus according to a fourteenth embodiment of the present invention.

The fourteenth embodiment differs from the twelfth embodiment in step S2 of photographing and step S3 of boundary image creation.

A light source that applies lighting so as to illuminate the entire background is provided behind the object BE when viewed from the camera CU.

For example, a diffusing plate FB is provided as shown in FIG. 36 and a flash BFU is used from behind the diffusing plate in synchronization with photographing.

Furthermore, the object BE is placed on a transparent stand CB.

Figure 37:
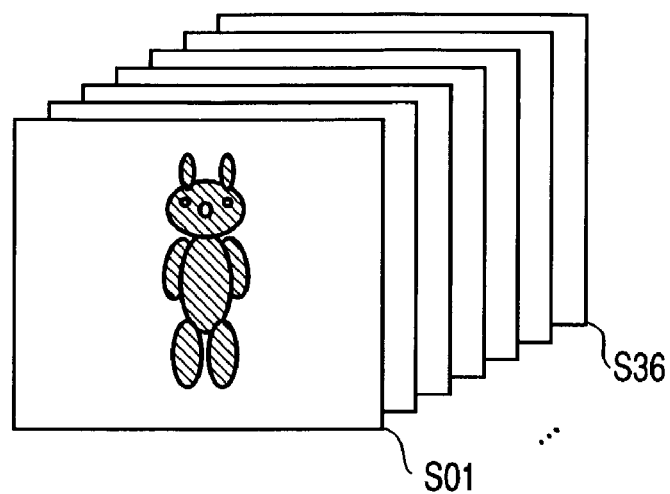
FIG. 37 shows silhouette images S01, S02, . . . , S36 applied to the 3-D information acquisition system of the fourteenth embodiment.

In the subsequent process, as the turntable RU is rotated as in the twelfth embodiment, for example, 36 silhouette images S01, S02, ..., S36 are photographed (see FIG. 37).

Photographing in this way makes it possible to obtain the same image as that against the sun. In the image, the background area has a high luminance and the object area is very dark.

Next, in step S3 of boundary image creation, a dark area is extracted from the silhouette image.

For example, the pixels with a luminance value equal to or larger than a certain threshold value are set as the background and the remaining area is set as the object.

The details of the photographing method and the cutout method are the same as in the first to eleventh embodiments of the shape extraction system.

FIFTEENTH EMBODIMENT

Figure 38:
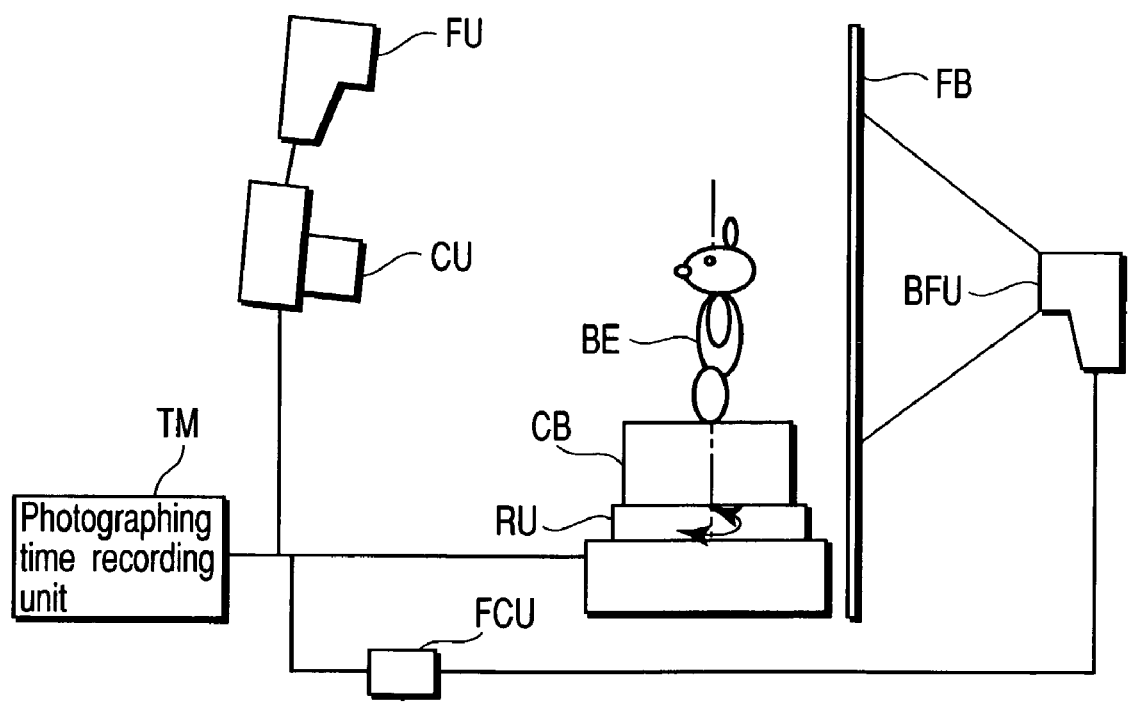
FIG. 38 is a block diagram showing the configuration of a 3-D information acquisition system according to a fifteenth embodiment of the present invention.

FIG. 38 is a block diagram showing the configuration of a 3-D information acquisition apparatus according to a fifteenth embodiment of the present invention.

The fifteenth embodiment differs from the thirteenth embodiment in step S1 of photographing, step S2 of boundary image creation, and step S4 of texture mapping.

A light source that applies lighting so as to illuminate the entire background is provided behind the object BE when viewed from the camera CU.

For example, a diffusing plate FB is provided as shown in FIG. 38 and a flash BFU is used from behind the diffusing plate in synchronization with photographing.

Photographing in this way makes it possible to obtain the same silhouette image as that against the sun. In the image, the background area has a high luminance and the object area is very dark.

A flash FU for lighting the front is provided. In addition, a flash switching unit FCU for turning on the flash FU and back flash BFU alternately or every several times is also provided.

On the turntable RU, a transparent stand CB is provided. The object BE is placed on the stand CB. As the turntable RU is rotated, texture images T01, T02, ..., T36 are photographed using the flash FU a plurality of times and silhouette images S01, S02, ..., S36 are photographed using the flash BFU a plurality of times. For example, the texture images and silhouette images are photographed alternately (see FIG. 39).

Next, in step S3 of boundary image creation, the dark area is extracted from the silhouette image.

In this case, for example, the pixels with a luminance value equal to or larger than a certain threshold value are set as the background and the remaining area is set as the object.

The details of the photographing method and the cutout method are the same as in the first to eleventh embodiments of the shape extraction system.

In the texture mapping step, not only the three-dimensional shape of the object but also color information about each part can be obtained by giving color information to the boxels on the basis of texture images as in the thirteenth embodiment.

SIXTEENTH EMBODIMENT

A sixteenth embodiment of the present invention differs from the twelfth to fifteenth embodiments in the shape estimation step S3 in the flowchart for the 3-D information acquisition apparatus.

FIGS. 40A to 40D show two-dimensionally how boxels change in the sixteenth embodiment.

In the sixteenth embodiment, the accuracy of one boxel is set lower than a desired accuracy.

When it is determined whether a boxel is outside the object as in the twelfth to fifteenth embodiment, a boxel whose eight vertexes are mixed inside and outside the object in determination is divided.

Although in FIGS. 40A to 40D, one square is divided into four parts for the sake of two-dimensional explanation, the object is divided into eight cubes in a three-dimensional space.

Then, the divided cubes are similarly subjected to outside determination. In this way, the dividing process is repeated recursively.

When the size of the boxel becomes large enough to achieve the desired accuracy, the process is completed. A similar process is carried out using the unprocessed boundary images.

With the three-dimensional reconstruction by recursive division, the object is divided into boxels whose accuracy is lower than the desired accuracy except for the boundary between the inside and outside of the object, the number of boxels to be processed decreases remarkably.

In one of the boxels once divided, when all of the boxels existing in the boxel are determined to be outside the object, those objects are combined into one boxel, thereby further decreasing the number of boxels.

The determination of whether a boxel is outside the object may be applied to not only eight vertexes but also, for example, the angular center of gravity of six surfaces or the midpoint of each side.

This makes it possible to reconstruct three-dimensionally an object of a more complex shape.

SEVENTEENTH EMBODIMENT

A seventeenth embodiment of the present invention, a modification of the twelfth embodiment, will be explained by reference to FIG. 41.

Since the basic photographing method in the seventeenth embodiment is the same as in the twelfth embodiment, explanation of the method will be omitted.

Figure 41:
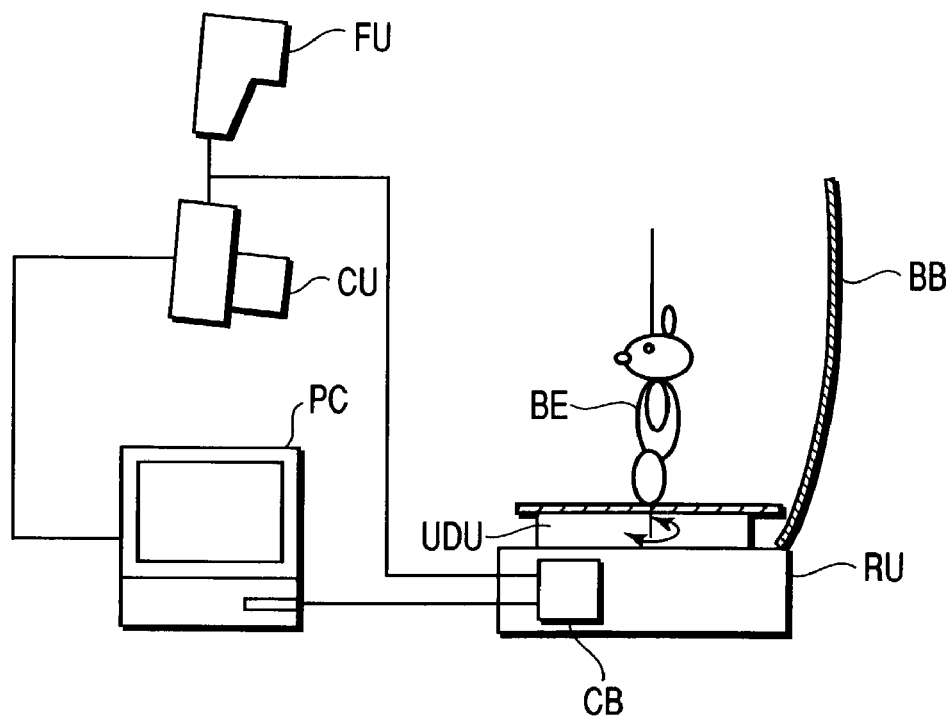
FIG. 41 is a block diagram showing the configuration of a 3-D information acquisition system according to a seventeenth embodiment of the present invention.

As shown in FIG. 41, a computer PC in which a photographing control module and a 3-D shape estimating module are installed in software is connected to the control section CB of a turntable RU, a relative movement module, and to a camera CU, a photographing module.

The control section CB has a relative position sensing module.

The relative position sensing module, which is capable of sensing the rotational position of the turntable RU, includes a sensor, such as a rotary encoder or a potentiometer.

It is assumed that the computer PC is connected to the camera CU and the control section CB of the turntable RU by serial communication, such as RS-232, USB, or IEEE1394, or by parallel communication, such as printer ports, which enables information to be exchanged with each other.

There is no limit to these communication methods.

A subject lighting flash FU as a normal lighting module and the control section CB are connected to the camera CU via an X contact (sync-contact) or the like.

In addition to X-contact, some types of flash have another serial interface for communicating with another device to inform of the completion of its charge.

A flash with such interface communicates with the connected flash unit at the same time and is capable of informing the information.

Hereinafter, a flash without such interface will be explained.

In this case, it is assumed that the interval between one photographing and another with the camera is long enough to charge the flash and there is no need to check whether the flash can be used in photographing.

With the above configuration, the computer PC performs the initial setting of the camera CU and turntable RU.

The initial setting of the camera includes, for example, exposure condition, shutter speed, the amount of zoom, and focal length.

The initial setting of the turntable RU includes, for example, a time chart of rotational speed that takes the size, shape, weight, and material of an object to be photographed into account as much as possible to prevent the object from turning over or deforming.

After the above various initial settings have been completed and the completion of photographing preparation is confirmed by communication, the turntable starts to rotate. Then, the computer PC outputs photographing request signals to the camera CU sequentially, which causes the camera CU to photograph a plurality of images from different viewpoints at desired intervals of photographing.

In this case, the same signal as the X contact signal from the camera CU or the signal whose phase is the same as that of the X contact signal is input as a photographic timing signal to the control section CB of the turntable RU.

Then, the control section CB causes the relative position sensing module to sense the positional information about the turntable RU at the time when the photographic timing signal is input (the timing with which photographing is done) and transmits the result to the computer PC.

Receiving the result, the computer PC records information about the position of the viewpoint in which photographing was done and estimates the 3-D shape using the information about the viewpoint position and the images picked up by the camera CU.

If the photographing request signal sent from the computer PC to the camera is decoded by the camera quickly enough and photographing is started without delay, there is no problem.

Generally, however, the delay is large for the shutter timing of the camera. Therefore, from the viewpoint of timing with which photographing is actually done, it is desirable that the X contact signal for photographing with a flash should be used.

In the seventeenth embodiment, since the same signal as the X contact signal or the signal whose phase is the same as the X contact signal is inputted to the control section CB, it is possible to acquire information about the position of the rotation of the turntable at the time when photographing was actually done with high accuracy.

Figure 42:
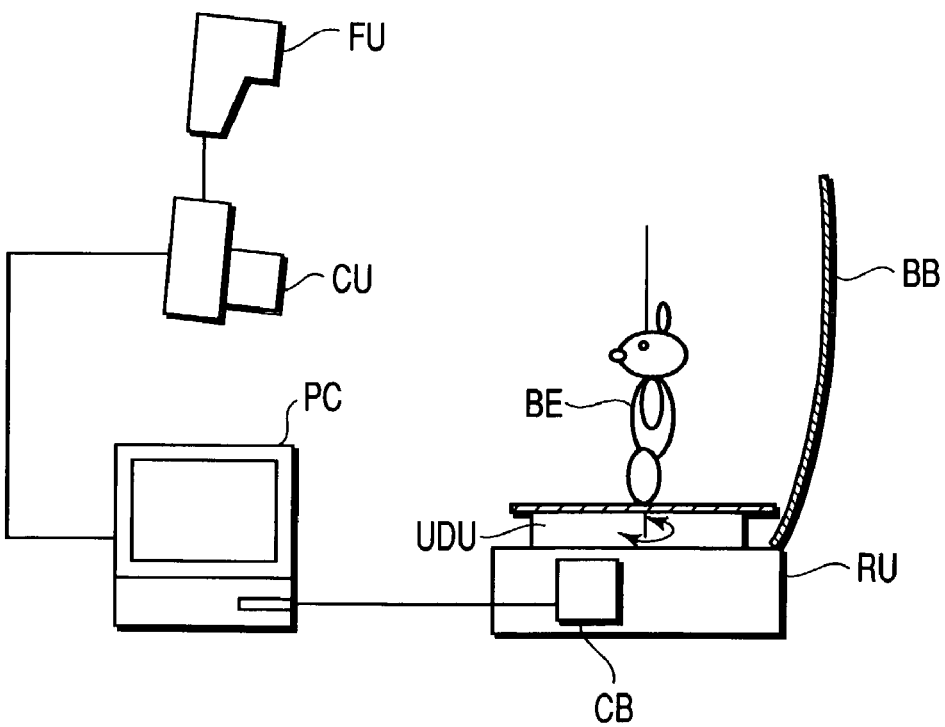
FIG. 42 is a block diagram showing the configuration of a modification of the 3-D information acquisition system according to the seventeenth embodiment.

When the processing time of the camera from the time the camera receives the photographing instruction signal from the computer PC including the photographing control module to the time photographing is actually started is sufficiently shorter than expected or when a low accuracy can be allowed sufficiently, the instruction signal from the photographing control module may be used as the photographic timing signal without inputting the X contact signal from the camera to the control section CB as shown in the modification of FIG. 42.

Although the X contact signal has been used as the photographic timing signal, a photographic timing signal using the emission of light by the flash may be used.

For example, emission of light by the flash may be received by a light-receiving module, thereby producing a photographic timing signal.

Although some types of camera do not have an X contact external flash drive function, an internal flash could generate a photographic timing signal by using the above function.

The camera body has the X contact, which is effective in transmitting a photographic timing signal to the relative position sensing module without cables/by radio.

System Configuration of Final Product)

Figure 43:
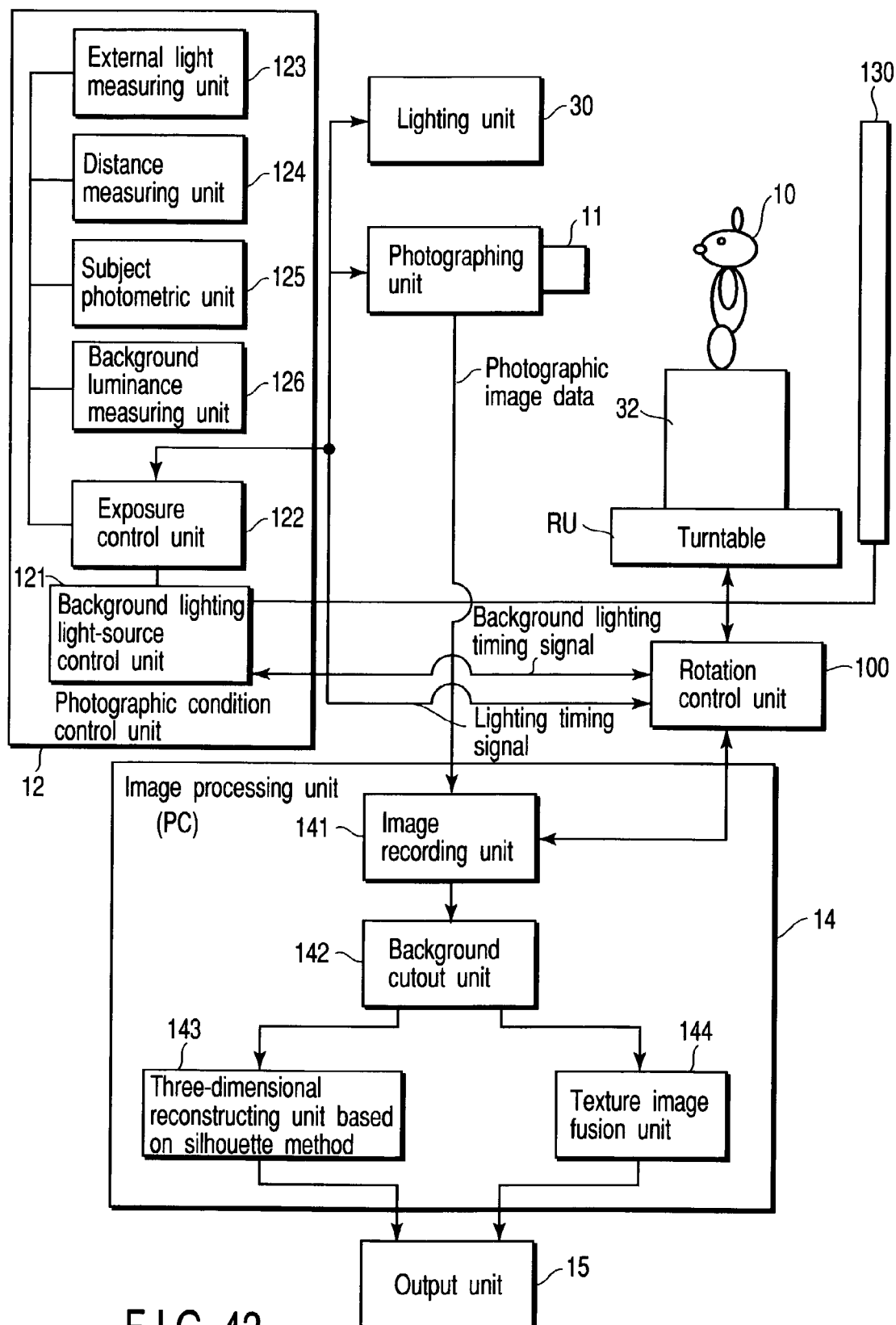
FIG. 43 is a block diagram showing the configuration of a final product of a shape extraction system including 3-D information to which the present invention is applied.

FIG. 43 is a block diagram showing the configuration of a final product of a shape extraction system including 3-D information to which the present invention is applied.

As shown in FIG. 43, in the configuration of a final product of a shape extraction system including 3-D information to which the present invention is applied, an object to be photographed 10 is placed on a transparent photographic stand 32 supported on a turntable (or photographic stand rotating unit) whose rotation is controlled by a rotation control unit 100.

A background lighting unit 130 is provided behind the object 10.

The background lighting unit 130 is connected to a background lighting light-source control unit 121 in a photographic condition control unit 12.

The photographic condition control unit 12 includes the background lighting light-source control unit 121 and an exposure control unit 122 connected to a camera (or photographing unit) 11 located in front of the object 10, a lighting unit (or subject lighting flash) 30, and a rotation control unit 100.

The photographic condition control unit 12 further includes an external light measuring unit 123, a distance measuring unit 124, a subject photometric unit 125, and a background luminance measuring unit 126.

The camera (photographing unit) 11 is connected to a background cutout unit 142 via an image recording unit 141 in an image processing unit 14, such as a personal computer (PC).

The background cutout unit 142 in the personal computer (PC) is connected to an output unit 15 via a three-dimensional reconstructing unit 143 based on a silhouette method and a texture image fusion unit 144.

The background lighting unit 130 emits visible scattered light from the main surface facing the object 10 and illuminates the whole of the object 10 from behind.

The photographic condition control unit 12 not only controls the photographing operation of the camera 11 and its exposure condition and the light-emitting operation and light-emitting intensity of the background lighting unit 130 but also supplies a background lighting timing signal and a subject lighting timing signal to the rotation control unit 100.

The photographic condition control unit 12 performs the following control: in a state where the condition control unit 12 sets specific conditions and turns on the background lighting unit 130, that is, in a state where background lighting is applied to the object 10, the control unit 12 acquires a first image (or silhouette image) as photographic image data obtained by photographing the object 10 with the camera (photographing unit) 11.

Furthermore, the photographic condition control unit 12 performs the following control: in a state where the condition control unit 12 sets specific conditions and turns off the background lighting unit 130, that is, in a state where background lighting is not applied to the object 10, the control unit 12 acquires a second image obtained by photographing the object 10 with the camera 11.

In this case, the second image may be acquired by causing the lighting unit 30 to illuminate so as to photograph the second image clearly.

In the shape extraction system including 3-D information to which the present invention is applied, two photographic images, the first image (silhouette image) and second image, are directed to the background cutout unit 142 via the image recording unit 141 in the image processing unit 14, such as a computer PC. Then, the shape of the object is extracted by the three-dimensional reconstructing unit 143 and texture image fusion unit 144.

Figure 44:
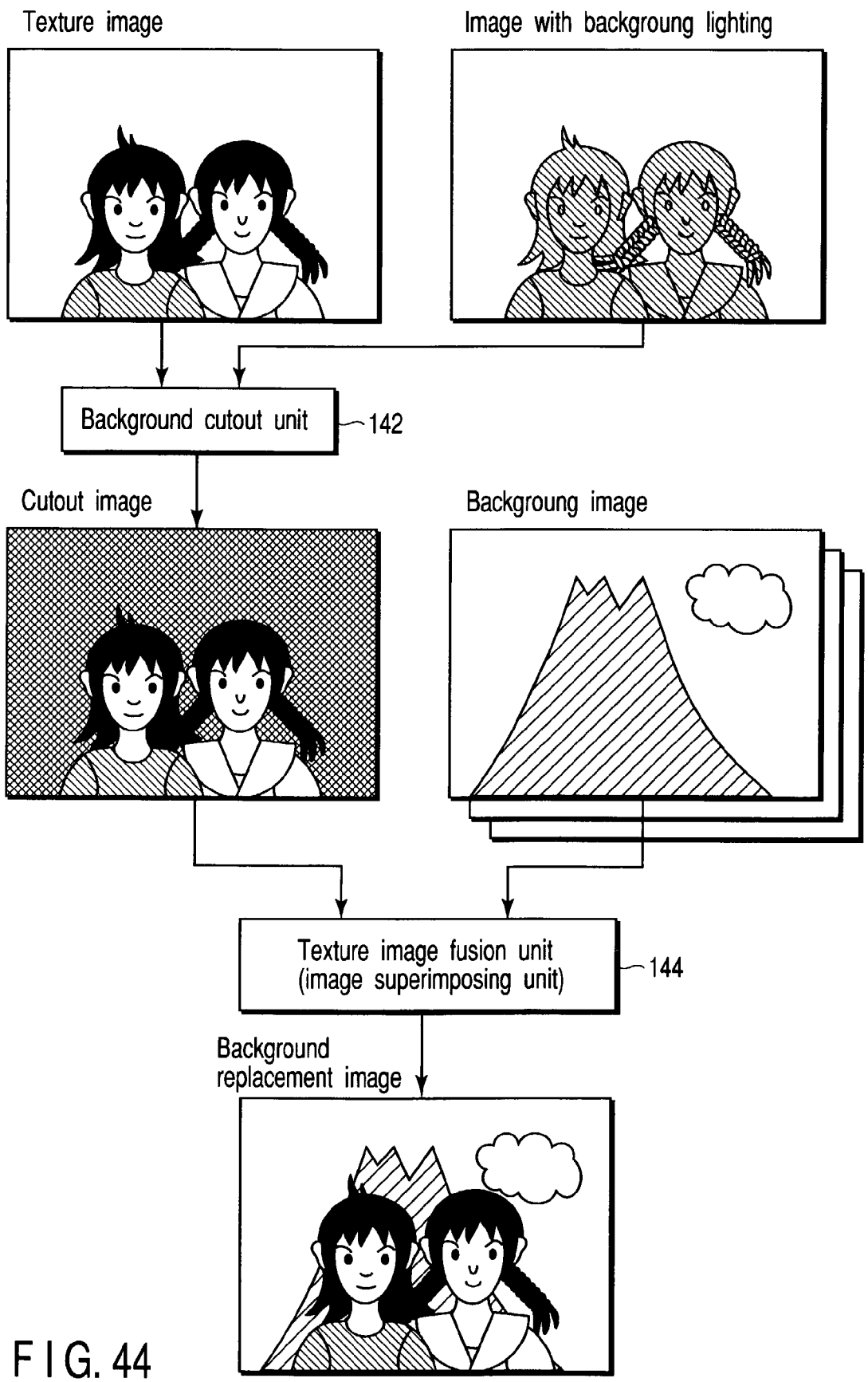
FIG. 44 is drawings to help explain an application to which the configuration of FIG. 41 is applied.

FIG. 44 is drawings to help explain an application using the configuration of FIG. 43.

That is, in the present invention, using the first image (silhouette image), the shape of the object is recognized and a cutout mask is formed. With this mask, the object area is cut out from the second image.

Specifically, as shown in FIG. 41, the first image (silhouette image) as an image with background lighting and the second image as a texture image without background lighting are directed to the background cutout unit 142, which creates a cutout image.

Then, this cutout image and a separately prepared desired background image are directed to the texture image fusion unit 144, which creates a background replacement image.

The details of the photographing method and the cutout method are the same as in first to eleventh embodiments of the shape extraction system.

The cutout image may be led to the three-dimensional reconstructing unit 143, which creates a solid image reconstructed three-dimensionally by a silhouette method.

The details of the acquisition of 3-D information by the three-dimensional reconstructing unit 143 using the silhouette method are the same as in twelfth to seventeenth embodiments of the 3-D information acquisition system.

Therefore, according to the first to eleventh embodiments of the present invention, it is possible provide a shape extraction apparatus and method which are capable of cutting out an image reliably at low cost and a shape extraction system including an image cutout apparatus and method, and more particularly a shape extraction system using the technique for extracting the boundary of an object on the basis of a photographic image obtained in a state where background lighting is applied to the object whose two-dimensional image boundary is to be extracted and a photographic image obtained in a state where no background lightning is applied to the object.

Furthermore, according to the twelfth to seventeenth embodiments of the present invention, it is possible to provide a 3-D information acquisition apparatus and method which are capable of not only determining the boundary with high accuracy and acquiring high-accuracy 3-D information but also reducing remarkably the memory capacity to acquire 3-D information about an object, shortening the photographing time, and keeping the object stable, and a 3-D information acquisition system including a 3-D information acquisition program, and more particularly a 3-D information acquisition system which acquires 3-D information about the object by using as component techniques a shape extraction system which extracts the two-dimensional boundary of the object on the basis of a photographic image obtained in a state where background lighting is applied to the object whose two-dimensional image boundary is to be extracted and a photographic image obtained in a state where no background lightning is applied to the object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A 3-D information acquisition apparatus comprising:
    a photographing module which photographs an image of an object;
    a background module which has a specific optical characteristic and which is provided behind said object and becomes the background of said object in photography;
    a relative movement module which moves said object and said photographing module relatively and continuously in such a manner that said photographing module can photograph images of said object from a plurality of viewpoints;
    a relative position sensing module which senses the relative position of said object and said photographing module at each of the viewpoints at which images of said object are photographed by said photographing module from a plurality of viewpoints; and
    a 3-D shape estimating module which recognizes the areas occupied by said object in the images photographed by said photographing module from the plurality of viewpoints by using the images of said object photographed by said photographing module from the plurality of viewpoints and information about the relative position sensed by said relative position sensing module and which estimates a 3-D shape of said object by using the areas occupied by said object, wherein said 3-D shape estimating module carries out a recognition and estimation process of not only recognizing the area occupied by said object on the basis of the image photographed with a visual line from a first viewpoint among the images photographed by said photographing module from a plurality of viewpoints but also estimating a 3-D shape of said object, and then
    carries out a recognition and estimation process of not only recognizing the area occupied by said object on the basis of the image photographed with a visual line from a second viewpoint opposing said first viewpoint but also estimating the 3-D shape of said object, and thereafter
    repeats said recognition and estimation process using the image from said viewpoint which corresponds to said image not to be used in said recognition and estimation process,
    and which is sandwiched between visual lines producing the largest angle difference corresponding to the two images used in said recognition and estimation process, and which is closest to the angle being interpolated in the largest angle difference.

2. A 3-D information acquisition method of using the images obtained by photographing an object from a plurality of viewpoints and information about the positions of said viewpoints to recognize the areas occupied by said object in the images, estimating a 3-D shape of said object on the basis of the areas occupied by said object, and acquiring 3-D information about said object, said 3-D information acquisition method comprising:
    carrying out a first recognition and estimation process of not only recognizing the area occupied by said object on the basis of the image photographed with a visual line from a first viewpoint among the images photographed from said plurality of viewpoints but also estimating a 3-D shape of said object;
    carrying out a second recognition and estimation process of not only recognizing the area occupied by said object on the basis of the image photographed with a visual line from a second viewpoint opposing said first viewpoint but also estimating the 3-D shape; and
    thereafter carrying out a third recognition and estimation process similar to said first and second recognition and estimation processes by using the image from said viewpoint which corresponds to said image not to be used in said recognition and estimation process,
    and which is sandwiched between visual lines producing the largest angle difference corresponding to the two images used in said recognition and estimation process, and which is closest to the angle being interpolated in the largest angle difference; and carrying out a fourth recognition and estimation process of repeating said third recognition and estimation process.

3. A 3-D information acquisition apparatus comprising: a photographing module which photographs an image of an object;
    a background lighting module which illuminates, directly or indirectly from behind said object, a range including at least all of the silhouette portion of said object or a part of the silhouette portion in the photographing range of said photographing module;
    a relative movement module which moves said object and said photographing module relatively and continuously in such a manner that said photographing module can photograph images of said object from a plurality of viewpoints;
    a relative position sensing module which senses the relative position of said object and said photographing module at oath of the viewpoints at which images of said object are photographed by said photographing module from a plurality of viewpoints; and
    a 3-D shape estimating module which recognizes an area occupied by said object in each of the images photographed by said photographing module from the plurality of viewpoints by using the images of said object photographed by said photographing module from the plurality of viewpoints and information about the relative position sensed by said relative position sensing module and which estimates a 3-D shape of said object by using the areas occupied by said object, wherein said background lighting module is turned on in photographing an image used to recognize the area occupied by said object,
    wherein said 3-D shape estimating module carries out a recognition and estimation process of not only recognizing the area occupied by said object on the basis of the image photographed with a visual line-from a first viewpoint among the images photographed by said photographing module from a plurality of viewpoints but also estimating a 3-D shape of said object, and then carries out a recognition and estimation process of not only recognizing the area occupied by said object on the basis of the image photographed with a visual line from a second viewpoint opposing said first viewpoint but also estimating the 3-D shape of said object, and thereafter repeats said recognition and estimation process using the image from said viewpoint which corresponds to said image not to be used in said recognition and estimation process, and which is sandwiched between visual lines producing the largest angle difference corresponding to the two images used in said recognition and estimation process, and which is closest to the angle being interpolated in the largest angle difference.

\* \* \* \* \*